United States Patent [19]

Guttag

[11] 4,422,143
[45] Dec. 20, 1983

[54] MICROPROCESSOR ALU WITH ABSOLUTE VALUE FUNCTION

[75] Inventor: Karl M. Guttag, Houston, Tex.

[73] Assignee: Texas Instruments Incorporated, Dallas, Tex.

[21] Appl. No.: 209,917

[22] Filed: Nov. 24, 1980

[51] Int. Cl.[3] ............................................. G06F 7/38
[52] U.S. Cl. .................................................. 364/200
[58] Field of Search ... 364/200 MS File, 900 MS File

[56] References Cited

U.S. PATENT DOCUMENTS

| 4,144,563 | 3/1979 | Heuer et al. | 364/200 |
|---|---|---|---|
| 4,161,784 | 7/1979 | Cushing et al. | 364/200 |
| 4,188,668 | 2/1980 | Finlay | 364/900 |
| 4,228,498 | 10/1980 | Moshier | 364/200 |

Primary Examiner—Leo H. Boudreau
Attorney, Agent, or Firm—John G. Graham

[57] ABSTRACT

A single-chip microprocessor device of the MOS/LSI type contains an ALU, several internal busses, a number of address/data registers, and an instruction register with associated control decode or microcontrol generator circuitry. The device communicates with external memory and peripherals by a bidirectional multiplexed address/data bus and a number of control lines. The ALU circuit is constructed to modify the carry-generate term so that the twos-complement function (and others) can be generated for either of the ALU inputs. By then connecting the most significant bit of the input to the arithmetic/logic control of the ALU, the absolute value function is generated. This results in faster signed multiply and divide instructions with less circuitry.

6 Claims, 20 Drawing Figures

Fig. 2c (con't.-2)

| | | OPCODE | | | | | | | | | | | | | | | |
|---|---|---|---|---|---|---|---|---|---|---|---|---|---|---|---|---|---|
| | INSTR. | 0 | 1 | 2 | 3 | 4 | 5 | 6 | 7 | 8 | 9 | 10 | 11 | 12 | 13 | 14 | 15 |
| GROUP G6 | MPYS | 0 | 0 | 0 | 0 | 0 | 0 | 0 | 1 | 1 | 1 | X | X | X | X | X | X |
| | DIVS | 0 | 0 | 0 | 0 | 0 | 0 | 0 | 1 | 1 | 0 | ← FIELD | | | | | |
| | BIND | 0 | 0 | 0 | 0 | 0 | 0 | 0 | 1 | 0 | 1 | | | | | | |
| | EVAD | 0 | 0 | 0 | 0 | 0 | 0 | 0 | 1 | 0 | 0 | | | | | | |
| GROUP G7 | ILLEGAL | 0 | 0 | 0 | 0 | 0 | 0 | 0 | 0 | 1 | 1 | X | X | X | X | X | X |
| | BLSK | 0 | 0 | 0 | 0 | 0 | 0 | 0 | 0 | 1 | 0 | 1 | 1 | ← FIELD | | | |
| | ILLEGAL | 0 | 0 | 0 | 0 | 0 | 0 | 0 | 0 | 1 | 0 | 1 | 0 | X | X | X | X |
| | LWP | 0 | 0 | 0 | 0 | 0 | 0 | 0 | 0 | 1 | 0 | 0 | 1 | | | | |
| | LST | 0 | 0 | 0 | 0 | 0 | 0 | 0 | 0 | 1 | 0 | 0 | 0 | FIELD | | | |
| G8 | ILLEGAL | 0 | 0 | 0 | 0 | 0 | 0 | 0 | 0 | 0 | 1 | X | X | X | X | X | X |
| GROUP G9 | ILLEGAL | 0 | 0 | 0 | 0 | 0 | 0 | 0 | 0 | 0 | 0 | 1 | 1 | X | X | X | X |
| | ILLEGAL | 0 | 0 | 0 | 0 | 0 | 0 | 0 | 0 | 0 | 0 | 1 | 0 | 1 | 1 | X | X |
| | ILLEGAL | 0 | 0 | 0 | 0 | 0 | 0 | 0 | 0 | 0 | 0 | 1 | 0 | 1 | 0 | 1 | 1 |
| | AM | 0 | 0 | 0 | 0 | 0 | 0 | 0 | 0 | 0 | 0 | 1 | 0 | 1 | 0 | 1 | 0 |
| | SM | 0 | 0 | 0 | 0 | 0 | 0 | 0 | 0 | 0 | 0 | 1 | 0 | 1 | 0 | 0 | 1 |
| | ILLEGAL | 0 | 0 | 0 | 0 | 0 | 0 | 0 | 0 | 0 | 0 | 1 | 0 | 1 | 0 | 0 | 0 |
| | ILLEGAL | 0 | 0 | 0 | 0 | 0 | 0 | 0 | 0 | 0 | 0 | 1 | 0 | 0 | X | X | X |
| | ILLEGAL | 0 | 0 | 0 | 0 | 0 | 0 | 0 | 0 | 0 | 0 | 0 | 1 | 1 | 1 | 1 | 1 |
| GROUP G10 | ILLEGAL | 0 | 0 | 0 | 0 | 0 | 0 | 0 | 0 | 0 | 0 | 0 | 1 | 1 | 1 | 1 | 0 |
| | SLAM | 0 | 0 | 0 | 0 | 0 | 0 | 0 | 0 | 0 | 0 | 0 | 1 | 1 | 1 | 0 | 1 |
| | SRAM | 0 | 0 | 0 | 0 | 0 | 0 | 0 | 0 | 0 | 0 | 0 | 1 | 1 | 1 | 0 | 0 |
| | ILLEGAL | 0 | 0 | 0 | 0 | 0 | 0 | 0 | 0 | 0 | 0 | 0 | 1 | 1 | 0 | X | X |
| | ILLEGAL | 0 | 0 | 0 | 0 | 0 | 0 | 0 | 0 | 0 | 0 | 0 | 1 | 0 | X | X | X |
| | ILLEGAL | 0 | 0 | 0 | 0 | 0 | 0 | 0 | 0 | 0 | 0 | 0 | 0 | X | X | X | X |
| | | 0 | 1 | 2 | 3 | 4 | 5 | 6 | 7 | 8 | 9 | 10 | 11 | 12 | 13 | 14 | 15 |

FIELD

Fig. 2c

| | | | | | | | | OPCODE | | | | | | | | | |
|---|---|---|---|---|---|---|---|---|---|---|---|---|---|---|---|---|---|
| | INSTR. | 0 | 1 | 2 | 3 | 4 | 5 | 6 | 7 | 8 | 9 | 10 | 11 | 12 | 13 | 14 | 15 |
| GROUP G0 | SOCB | 1 | 1 | 1 | 1 | X | X | X | X | X | X | X | X | X | X | X | X |
| | SOC | 1 | 1 | 1 | 0 | X | X | X | X | X | X | X | X | X | X | X | X |
| | MOVB | 1 | 1 | 0 | 1 | | | | | | | | | | | | |
| | MOV | 1 | 1 | 0 | 0 | | | | | | | | | | | | |
| | AB | 1 | 0 | 1 | 1 | | | | | | | | | | | | |
| | A | 1 | 0 | 1 | 0 | ←FIELD→ | | | | | | | | | | | |
| | CB | 1 | 0 | 0 | 1 | | | | | | | | | | | | |
| | C | 1 | 0 | 0 | 0 | | | | | | | | | | | | |
| | SB | 0 | 1 | 1 | 1 | | | | | | | | | | | | |
| | S | 0 | 1 | 1 | 0 | | | | | | | | | | | | |
| | SZCB | 0 | 1 | 0 | 1 | | | | | | | | | | | | |
| | SZC | 0 | 1 | 0 | 0 | | | | | | | | | | | | |
| GROUP G1 | DIV | 0 | 0 | 1 | 1 | 1 | 1 | | | | | | | | | | |
| | MPY | 0 | 0 | 1 | 1 | 1 | 0 | | | | | | | | | | |
| | STCR | 0 | 0 | 1 | 1 | 0 | 1 | | ←FIELD→ | | | | | | | | |
| | LDCR | 0 | 0 | 1 | 1 | 0 | 0 | | | | | | | | | | |
| | XOP | 0 | 0 | 1 | 0 | 1 | 1 | | | | | | | | | | |
| | XOR | 0 | 0 | 1 | 0 | 1 | 0 | | | | | | | | | | |
| | CZC | 0 | 0 | 1 | 0 | 0 | 1 | | | | | | | | | | |
| | COC | 0 | 0 | 1 | 0 | 0 | 0 | | | | | | | | | | |
| GROUP G2 | TB | 0 | 0 | 0 | 1 | 1 | 1 | 1 | 1 | | | | | | | | |
| | SBZ | 0 | 0 | 0 | 1 | 1 | 1 | 1 | 0 | | | | | | | | |
| | SBO | 0 | 0 | 0 | 1 | 1 | 1 | 0 | 1 | | | | | | | | |
| | JOP | 0 | 0 | 0 | 1 | 1 | 1 | 0 | 0 | | | | | | | | |
| | JH | 0 | 0 | 0 | 1 | 1 | 0 | 1 | 1 | | | | | | | | |
| | JL | 0 | 0 | 0 | 1 | 1 | 0 | 1 | 0 | | | | | | | | |
| | JNO | 0 | 0 | 0 | 1 | 1 | 0 | 0 | 1 | | | | | | | | |
| | JOO | 0 | 0 | 0 | 1 | 1 | 0 | 0 | 0 | ←FIELD→ | | | | | | | |
| | JNC | 0 | 0 | 0 | 1 | 0 | 1 | 1 | 1 | | | | | | | | |
| | JNE | 0 | 0 | 0 | 1 | 0 | 1 | 1 | 0 | | | | | | | | |
| | JGT | 0 | 0 | 0 | 1 | 0 | 1 | 0 | 1 | | | | | | | | |
| | JHB | 0 | 0 | 0 | 1 | 0 | 1 | 0 | 0 | | | | | | | | |
| | JEQ | 0 | 0 | 0 | 1 | 0 | 0 | 1 | 1 | | | | | | | | |
| | JLL | 0 | 0 | 0 | 1 | 0 | 0 | 1 | 0 | | | | | | | | |
| | JLT | 0 | 0 | 0 | 1 | 0 | 0 | 0 | 1 | | | | | | | | |
| | JMP | 0 | 0 | 0 | 1 | 0 | 0 | 0 | 0 | ←FIELD→ | | | | | | | |
| | ILLEGAL | 0 | 0 | 0 | 0 | 1 | 1 | 1 | X | X | X | X | X | X | X | X | X |
| | ILLEGAL | 0 | 0 | 0 | 0 | 1 | 1 | 0 | 1 | X | X | X | X | X | X | X | X |
| | ILLEGAL | 0 | 0 | 0 | 0 | 1 | 1 | 0 | 0 | 1 | X | X | X | X | X | X | X |
| | ILLEGAL | 0 | 0 | 0 | 0 | 1 | 1 | 0 | 0 | 0 | 1 | X | X | X | X | X | X |
| | ILLEGAL | 0 | 0 | 0 | 0 | 1 | 1 | 0 | 0 | 0 | 0 | 1 | X | X | X | X | X |
| | ILLEGAL | 0 | 0 | 0 | 0 | 1 | 1 | 0 | 0 | 0 | 0 | 0 | 1 | X | X | X | X |
| | ILLEGAL | 0 | 0 | 0 | 0 | 1 | 1 | 0 | 0 | 0 | 0 | 0 | 0 | 1 | X | X | X |
| | | 0 | 1 | 2 | 3 | 4 | 5 | 6 | 7 | 8 | 9 | 10 | 11 | 12 | 13 | 14 | 15 |

TD → TYPE OF DESTINATION ADDRESSING
D → DESTINATION ADDRESS BITS
TS → TYPE OF SOURCE ADDRESSING
S → SOURCE ADDRESS BITS

Fig. 2c (con't. -1)

| Group | INSTR. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| GROUP G3 | TSMB | 0 | 0 | 0 | 0 | 1 | 1 | ←| FIELD |→ | | | | 1 | 0 | 1 | 1 |
| | TCMB | 0 | 0 | 0 | 0 | 1 | 1 | | | | | | | 1 | 0 | 1 | 0 |
| | TMB | 0 | 0 | 0 | 0 | 1 | 1 | | | | | | | 1 | 0 | 0 | 1 |
| | ILLEGAL | 0 | 0 | 0 | 0 | 1 | 1 | | | | | | | 1 | 0 | 0 | 0 |
| | ILLEGAL | 0 | 0 | 0 | 0 | 1 | 1 | | | | | | | 0 | X | X | X |
| | SRC | 0 | 0 | 0 | 0 | 1 | 0 | 1 | 1 | X | X | X | X | X | X | X | X |
| | SLA 15 | 0 | 0 | 0 | 0 | 1 | 0 | 1 | 0 | X | X | X | X | X | X | X | X |
| | SL | 0 | 0 | 0 | 0 | 1 | 0 | 0 | 1 | X | X | X | X | X | X | X | X |
| | SRA | 0 | 0 | 0 | 0 | 1 | 0 | 0 | 0 | X | X | X | X | X | X | X | X |
| GROUP G4 | LDD | 0 | 0 | 0 | 0 | 0 | 1 | 1 | 1 | 1 | 1 | X | X | X | X | X | X |
| | LDS | 0 | 0 | 0 | 0 | 0 | 1 | 1 | 1 | 1 | 0 | X | X | X | X | X | X |
| | ABS | 0 | 0 | 0 | 0 | 0 | 1 | 1 | 1 | 0 | 1 | X | | | | | |
| | SETO | 0 | 0 | 0 | 0 | 0 | 1 | 1 | 1 | 0 | 0 | X | | | | | |
| | SWPB | 0 | 0 | 0 | 0 | 0 | 1 | 1 | 0 | 1 | 1 | X | | | | | |
| | BL | 0 | 0 | 0 | 0 | 0 | 1 | 1 | 0 | 1 | 0 | X | ←| FIELD |→ | | |
| | DECT | 0 | 0 | 0 | 0 | 0 | 1 | 1 | 0 | 0 | 1 | X | | | | | |
| | DEC | 0 | 0 | 0 | 0 | 0 | 1 | 1 | 0 | 0 | 0 | X | | | | | |
| | INCT | 0 | 0 | 0 | 0 | 0 | 1 | 0 | 1 | 1 | 1 | X | | | | | |
| | INC | 0 | 0 | 0 | 0 | 0 | 1 | 0 | 1 | 1 | 0 | X | | | | | |
| | INV | 0 | 0 | 0 | 0 | 0 | 1 | 0 | 1 | 0 | 1 | X | | | | | |
| | NEG | 0 | 0 | 0 | 0 | 0 | 1 | 0 | 1 | 0 | 0 | X | | | | | |
| | CLR | 0 | 0 | 0 | 0 | 0 | 1 | 0 | 0 | 1 | 1 | X | | | | | |
| | X | 0 | 0 | 0 | 0 | 0 | 1 | 0 | 0 | 1 | 0 | X | | | | | |
| | B | 0 | 0 | 0 | 0 | 0 | 1 | 0 | 0 | 0 | 1 | X | | | | | |
| | BLWP | 0 | 0 | 0 | 0 | 0 | 1 | 0 | 0 | 0 | 0 | X | | | | | |
| GROUP G5 | LREX | 0 | 0 | 0 | 0 | 0 | 0 | 1 | 1 | 1 | 1 | 1 | | | | | |
| | CKOF | 0 | 0 | 0 | 0 | 0 | 0 | 1 | 1 | 1 | 1 | 0 | ←| FIELD |→ | | |
| | CKON | 0 | 0 | 0 | 0 | 0 | 0 | 1 | 1 | 1 | 0 | 1 | | | | | |
| | RTWP | 0 | 0 | 0 | 0 | 0 | 0 | 1 | 1 | 1 | 0 | 0 | | | | | |
| | RSET | 0 | 0 | 0 | 0 | 0 | 0 | 1 | 1 | 0 | 1 | 1 | | | | | |
| | IDLE | 0 | 0 | 0 | 0 | 0 | 0 | 1 | 1 | 0 | 1 | 0 | | | | | |
| | | 0 | 0 | 0 | 0 | 0 | 0 | 1 | 1 | 0 | 0 | 1 | | | | | |
| | LIMI | 0 | 0 | 0 | 0 | 0 | 0 | 1 | 1 | 0 | 0 | 0 | | | | | |
| | LWPI | 0 | 0 | 0 | 0 | 0 | 0 | 1 | 0 | 1 | 1 | 1 | 0 | 0 | 0 | 0 | 0 |
| | STST | 0 | 0 | 0 | 0 | 0 | 0 | 1 | 0 | 1 | 1 | 0 | | | | | |
| | STWP | 0 | 0 | 0 | 0 | 0 | 0 | 1 | 0 | 1 | 0 | 1 | | | | | |
| | CI | 0 | 0 | 0 | 0 | 0 | 0 | 1 | 0 | 1 | 0 | 0 | | | | | |
| | ORI | 0 | 0 | 0 | 0 | 0 | 0 | 1 | 0 | 0 | 1 | 1 | | | | | |
| | ANDI | 0 | 0 | 0 | 0 | 0 | 0 | 1 | 0 | 0 | 1 | 0 | | | | | |
| | AI | 0 | 0 | 0 | 0 | 0 | 0 | 1 | 0 | 0 | 0 | 1 | | | | | |
| | LI | 0 | 0 | 0 | 0 | 0 | 0 | 1 | 0 | 0 | 0 | 0 | | | | | |

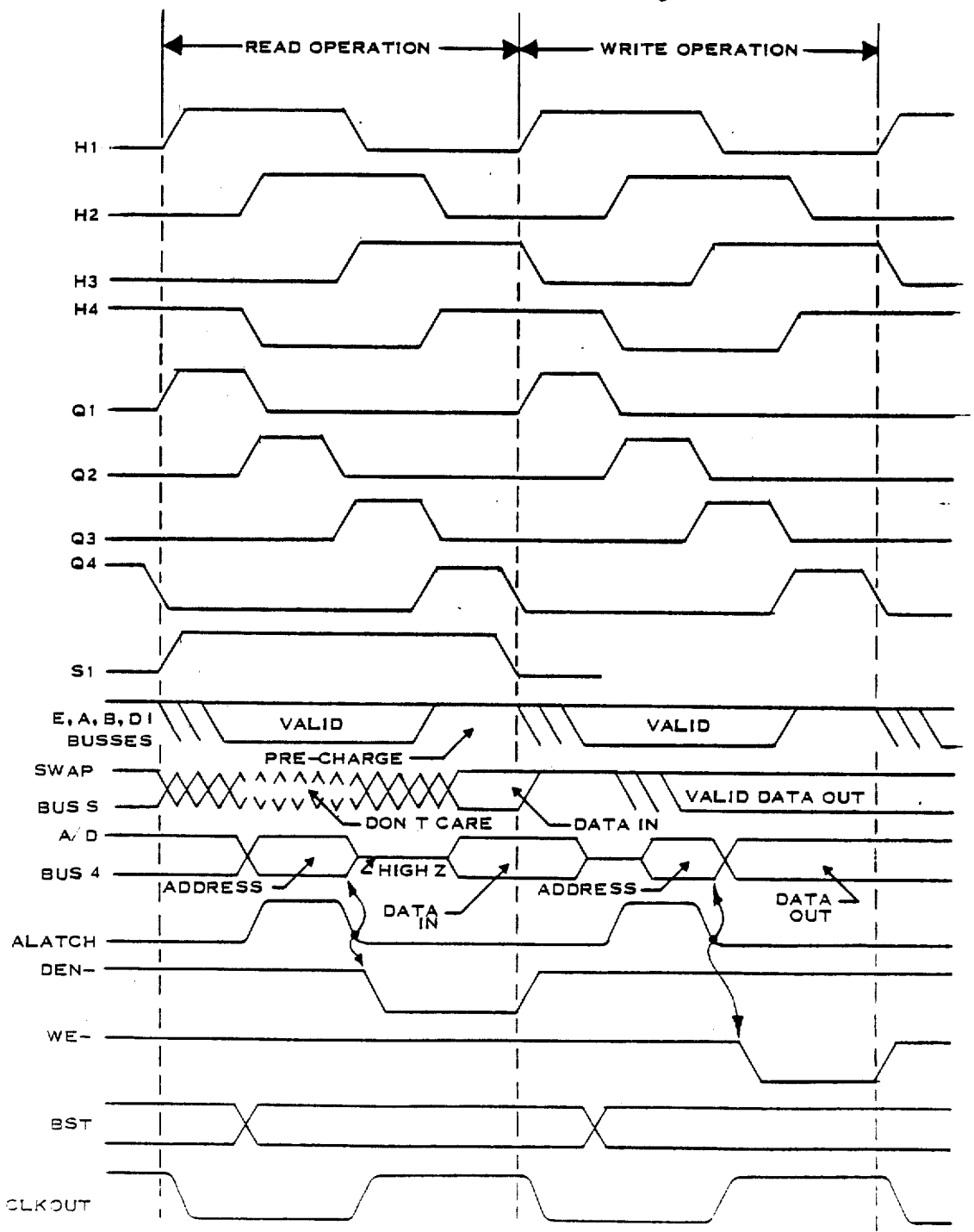

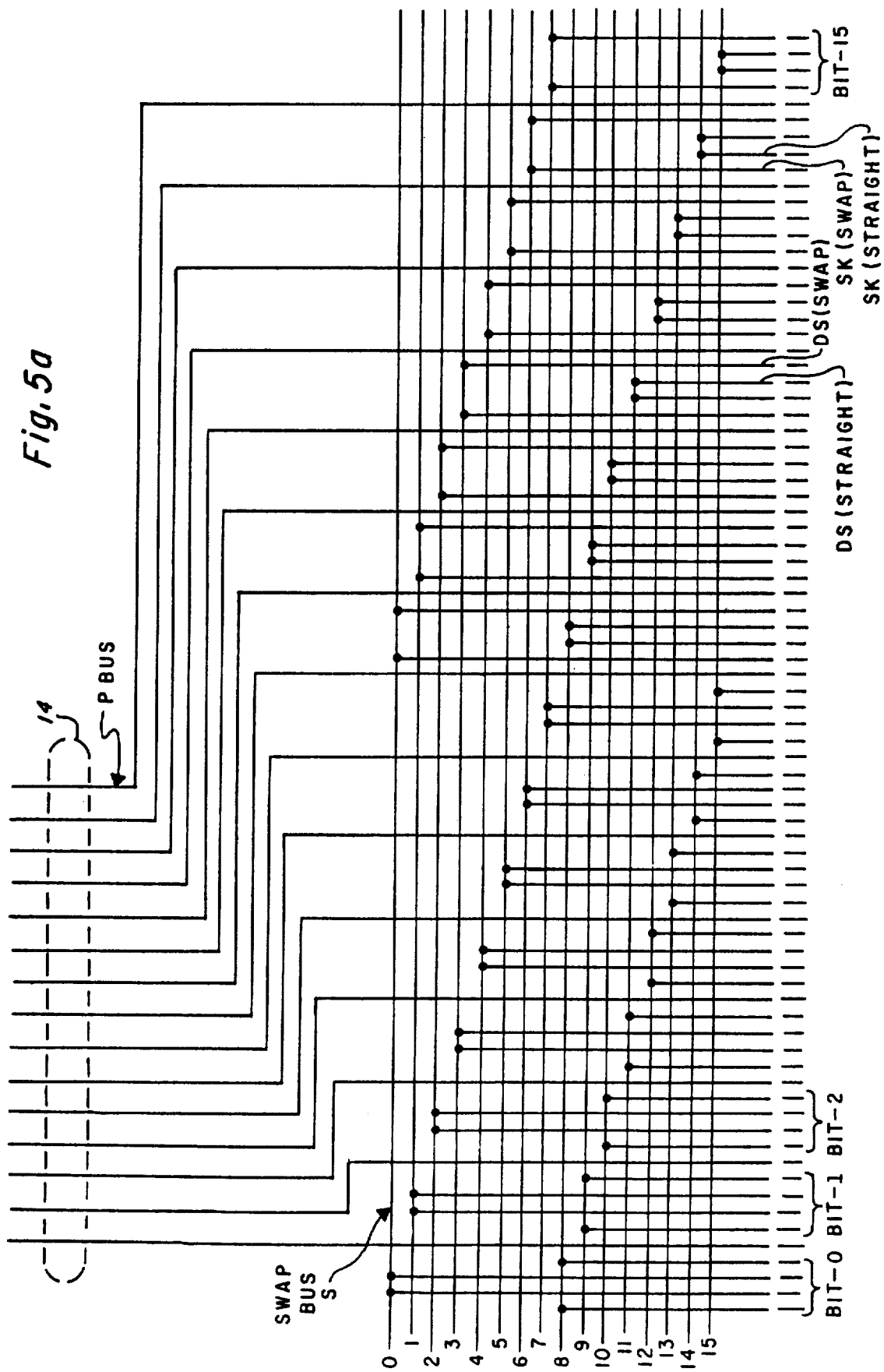

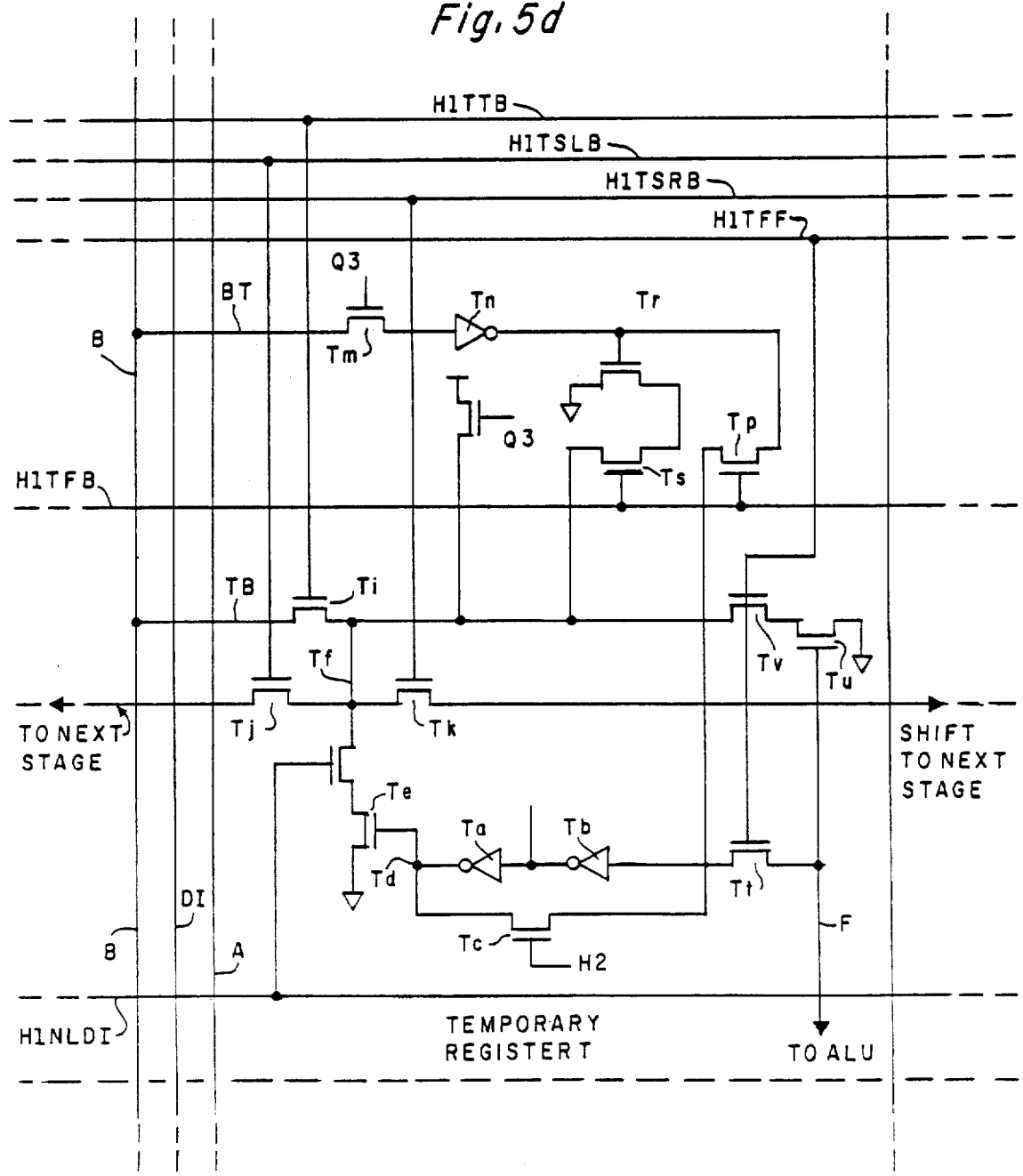

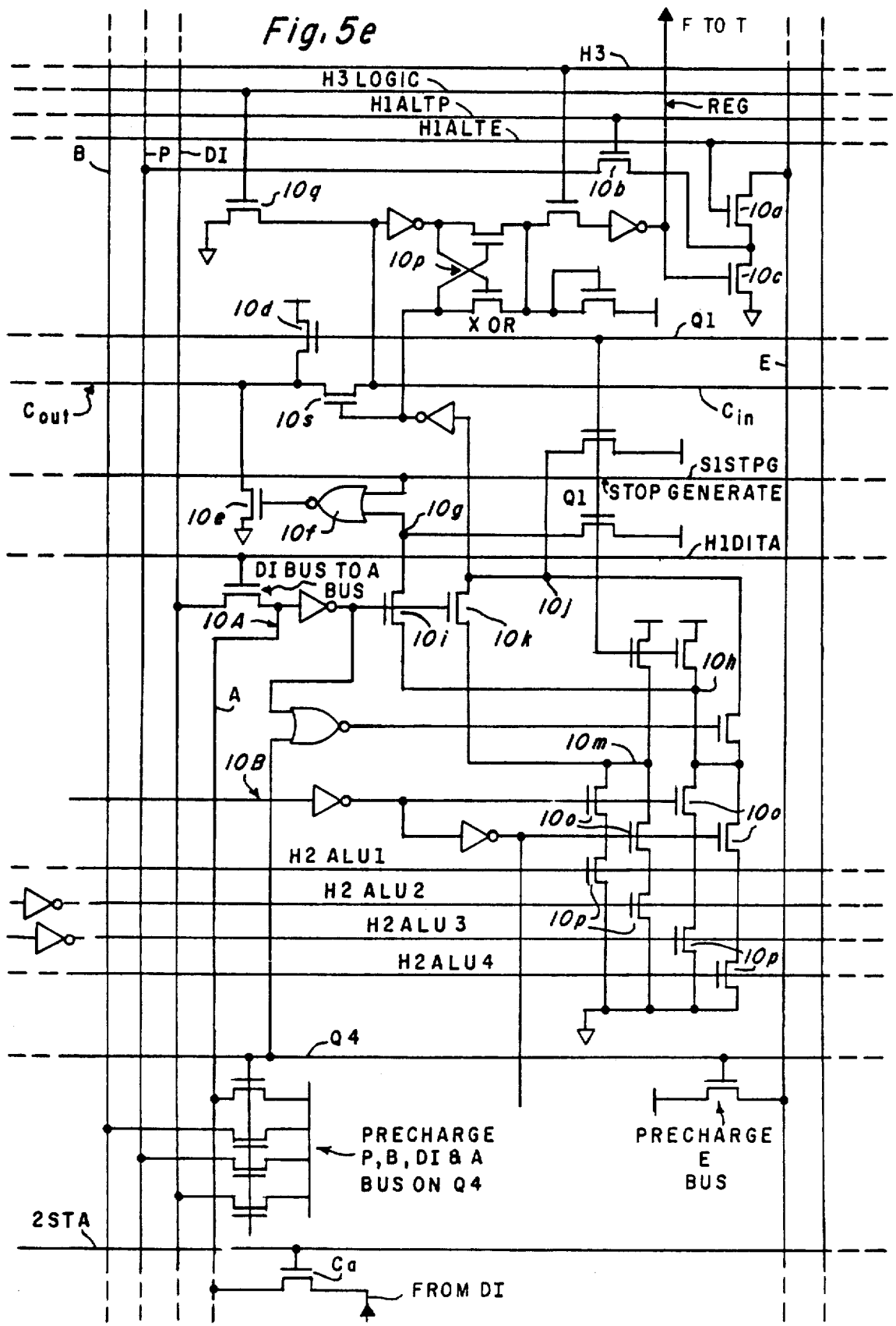

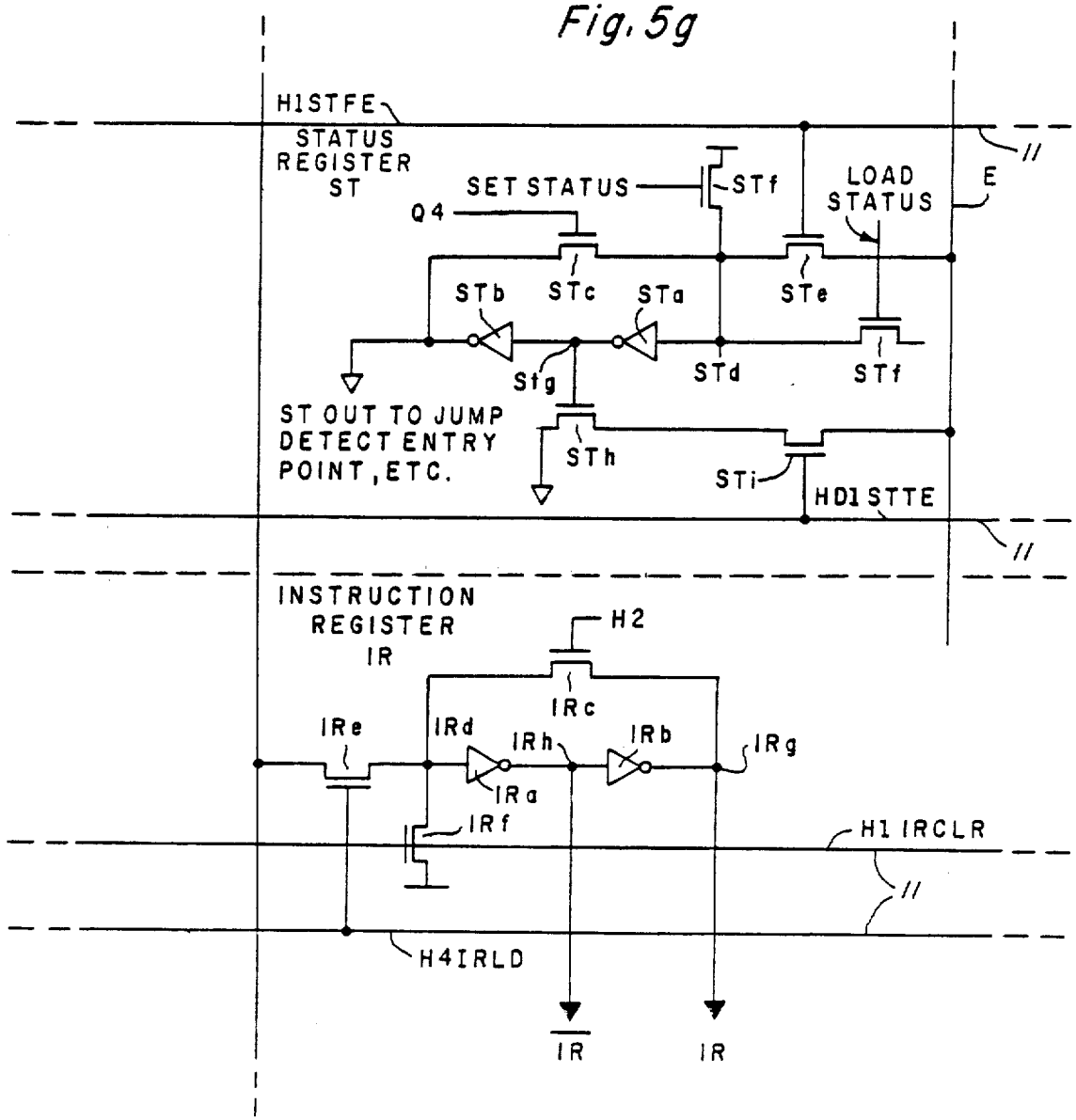

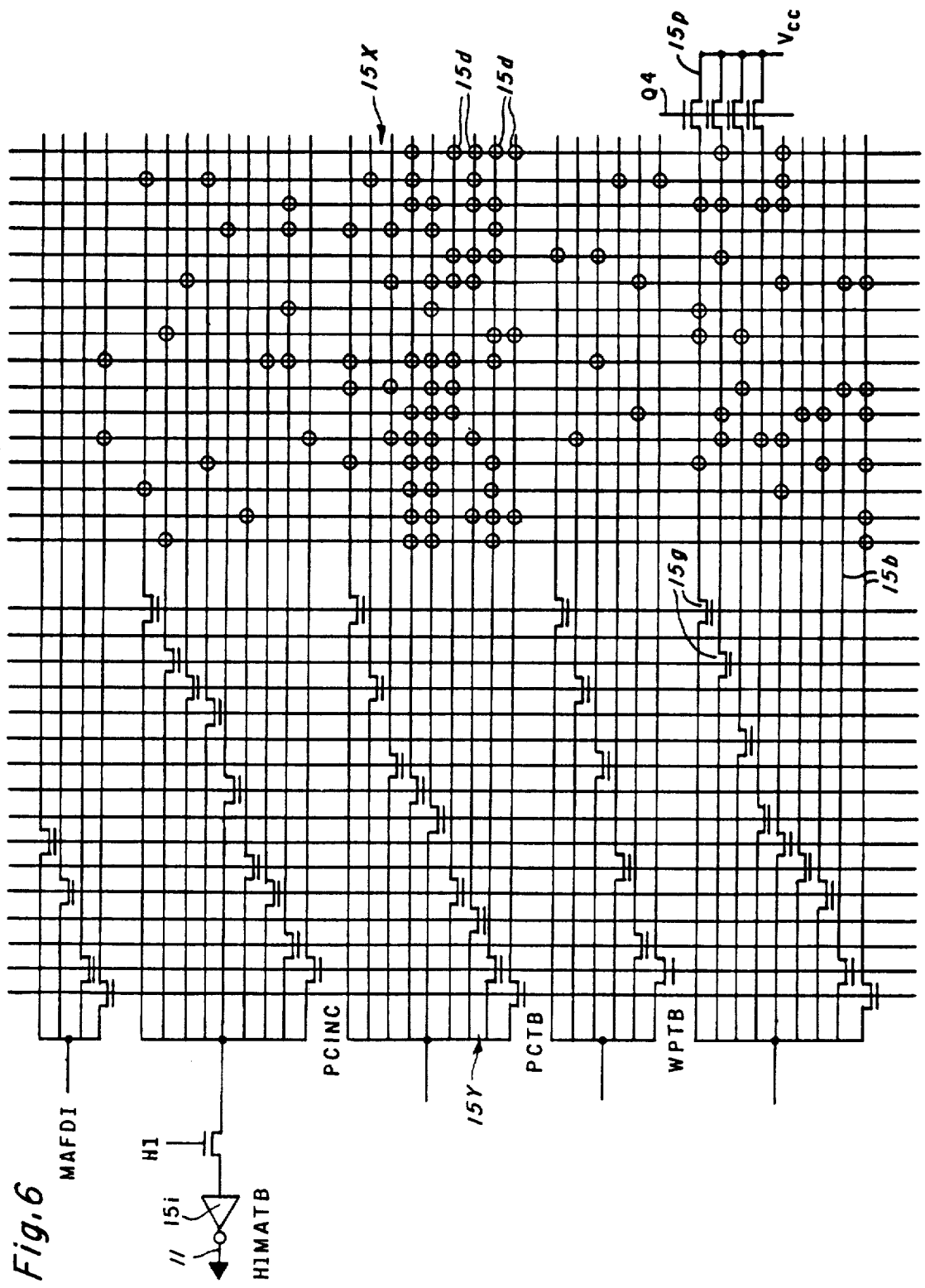

| STATE TIME | OPERATION | ALU INPUTS/OUTPUT | ADDRESS/DATA BUS 4 | OTHER |
|---|---|---|---|---|
| S1 | PRE-FETCH INSTRUCTION AT ADDRESS IN PC FOR THE ADD OPERATION; PERFORM ALU OPERATION FOR OLD INSTRUCTION | PERFORMS ALU OPERATION FOR OLD INSTRUCTION, RESULT TO E BUS DELAYED | READ CYCLE; ADDRESS FROM PC OUT VIA P BUS AND BUS 4; DATA BACK IN ON BUS 4 TO K REG VIA BUS S | INCREMENT PC DEN-ACTIVE |
| S2 | WRITE RESULT OF OLD INSTRUCTION AT OLD DESTINATION ADDRESS; CALCULATE SOURCE ADDRESS FOR NEW INSTRUCTION | ADDS 2S + WP; A INPUT IS S FIELD FOR INCOMING INSTRUCTION WORD OFF DI BUS; B INPUT IS WP VIA B BUS OUTPUT TO E, DELAYED | WRITE CYCLE; DEST. ADDRESS FOR OLD INSTRUCTION ON BUS 4 FROM MA, THEN DATA OUT ON BUS 4 FROM D REG. | LOAD IR VIA DI BUS AND DETERMINE ENTRY POINT FOR ADD INSTRUCTION |
| S3 | FETCH SOURCE OPERAND AT ADDRESS IN MA; CALCULATE ADDRESS OF DESTINATION REGISTER | ADDS 2D + WP; A INPUT IS D FIELD FROM INSTRUCTION; B INPUT IS WP RESULT TO MA VIA E DELAYED | READ CYCLE; SOURCE ADDRESS OUT FROM MA TO BUS 4; DATA BACK IN ON BUS 4 TO K REG. | DEN-ACTIVE |
| S4 | FETCH CONTENTS OF DESTINATION REGISTER | ADDS 2D + WP AGAIN; RESULT TO MA TO BE USED AS THE DESTINATION WRITE | READ CYCLE; ADDRESS (2D = WP) GOES OUT, CONTENTS OF THAT ADDRESS BACK IN TO BE USED FOR NEXT FETCH | DEN-ACTIVE |
| S5 | FETCH DESTINATION OPERAND | ADDS K PLUS ZERO AND STORES RESULT IN T REG. | READ CYCLE; DESTINATION ADDRESS FROM MA GOES OUT ON BUS 4; DEST. OPERAND COMES BACK ON BUS 4 INTO K REG. | DEN-ACTIVE |
| S6 | PERFORM THE ADD OPERATION FOR THIS INSTRUCTION, AND PRE-FETCH THE CONTENTS OF ADDRESS IN PC FOR THE NEXT INSTRUCTION | PERFORMS ADD OPERATION FOR CURRENT ADD INSTRUCTION; A INPUT IS FROM K, B INPUT FROM T VIA F, OUTPUT TO E DELAYED | READ CYCLE; ADDRESS FOR NEXT INSTRUCTION OUT VIA P BUS AND BUS 4; DATA BACK IN ON BUS 4 TO K REG. VIA BUS S | INCREMENT PC DEN-ACTIVE |
| S7 | WRITE RESULT OF THIS ADD OPERATION AT DESTINATION ADDRESS; CALCULATE SOURCE ADDRESS FOR NEXT INSTRUCTION | ADDS 2S + WP FOR NEXT INSTRUCTION | WRITE CYCLE; DESTINATION ADDRESS FOR ADD INSTRUCTION GOES OUT ON BUS 4 FROM MA, THEN DATA ONTO BUS 4 FROM D REG. | LOAD IR VIA DI BUS AND DETERMINE ENTRY POINT FOR NEXT INSTRUCTION |

Fig. 7

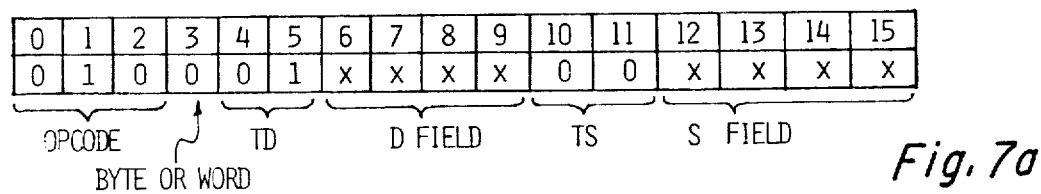

| STATE TIMES; MICROCODE LABEL | CROM 15 ADDR. | OPERATION | ALU | BUS STATUS CODE |
|---|---|---|---|---|
| SCALX | | Fetch Source Operand | Add 2D+WP | |
| SDIV1 | 06 | Calculate address of half of operand | Add 2+WP | 001 |
| 2 | A2 | Fetch Reg. 1 @ MA | K twos complement result to D | 110 |
| 3 | 9D | Address of other half of operand | Add zero to WP | 001 |
| 4 | D4 | Fetch Reg. 0 @ MA | Add zero to K, result to T | 110 |
| 5 | C1 | Negate contents of D reg. | Neg. D, result to D | 001 |
| 6 | C2 | | Subtract 0 from T with Carry, result to MQ | 001 |
| 7 | CD | | K , one's complement result to T | 001 |
| 8 | C7 | | Add D + T | 001 |
| 9 | 5D | Check if result 16 bits | | 001 |
| * 10 | C4 | Divide, increment SC | Add D to shift-left T result to T | 001 |
| * 11 | C5 | Divide, increment SC | Add D to shift-left T, result to T | 001 |
| 12 | C0 | MQ to D | | 001 |
| 13 | C6 | | Add zero to T | 001 |
| 14 | AF | | D two's complement, result to D, MQ | 001 |
| 15 | A7 | Subtract zero from T, with carry | 0 CSUB T, result to MQ | 001 |
| 16 | A6 | | Add zero to D, result to D | |
| 17 | AD | Generate Address for | Add 2 to MA, result to MA, increment PC | 110 |
| 18 | BE | | Increment PC Add 0 to MA | 011 |
| DW1 | | Destination Write | | |

* One of these repeats sixteen times, holding CROM 15 address in Register 21, performing a single-state divide each time then left-shifting

MICROPROCESSOR ALU WITH ABSOLUTE VALUE FUNCTION

RELATED CASES

This application discloses subject matter also disclosed and claimed in copending applications Sec. Nos. 209,915; 210,105; 210,106; 210,108; and 210,109, all filed herewith and assigned to Texas Instruments.

BACKGROUND OF THE INVENTION

This invention relates to integrated semiconductor devices and systems, and more particularly to features used in an electronic digital processing system which may employ a single-chip microprocessor or microcomputer device.

A microprocessor device is a central processing unit or CPU for a digital processor which is contained in a single semiconductor integrated circuit, usually fabricated by "MOS/LSI" technology as shown in U.S. Pat. No. 3,757,306 issued to Gary W. Boone and assigned to Texas Instruments. The Boone patent shows an 8-bit CPU on a chip including a parallel ALU, a register stack, an instruction register and a control decoder, all interconnected using a bidirectional parallel bus. The term microprocessor usually refers to a device which employs external memory for program and data storage, while the term microcomputer refers to such a device which has on-chip ROM and RAM for program and data storage; the terms are also used interchangeably, however. U.S. Pat. No. 4,074,351, issued to Gary W. Boone and Michael J. Cochran, assigned to Texas Instruments, shows a single-chip "microcomputer" type device which contains a 4-bit parallel ALU and its control and circuitry with ROM and RAM for program and data storage.

Subsequent to the time U.S. Pat. Nos. 3,757,306 and 4,074,351 were originally filed many improvements have been made in microprocessors and microcomputers to multiply the speed and capabilities of these devices and reduce the cost of manufacture. Generally, the trend in the semiconductor industry is toward providing more circuitry in less space, i.e., smaller chip size. As photolithographic techniques are improved the line widths and resolutions are improved, providing added density, but circuit and system improvements also contribute to the goals of increased performance with smaller chip size. Some of these improvements in microprocessors are disclosed in the following U.S. Pat. Nos., all assigned to Texas Instruments: 3,991,305 issued to Edward R. Caudel and Joseph H. Raymond Jr.; 4,156,927 issued to David J. McElroy and Graham S. Tubbs; 3,934,233 issued to R. J. Fisher and G. D. Rogers; 3,921,142 issued to J. D. Bryant and G. A. Hartsell; 3,900,722 issued to M. J. Cochran and C. P. Grant; 3,932,846 issued to C. W. Brixey et. al.; 3,939,335 issued to G. L. Brantingham, L. H. Phillips and L. T. Novak; 4,125,901 issued to S. P. Hamilton, L. L. Miles, et. al.; 4,158,432 issued to M. G. VanBavel; 3,757,308 and 3,984,816.

The demand for additional capabilities in microprocessor devices at lower cost continues, however, in spite of the advances which have been made in these technologies in recent years. Of course, not only the parts cost is of concern; the major concern is in lowering the cost of software and the amount of memory needed to store the programs, as well as the execution time for complex programs.

Examples of some of the various microprocessor and microcomputer devices in this evolution of the technology are described in publications as well as the above-mentioned patents. In Electronics, Sept. 25, 1972, p. 31-32, a 4-bit P-channel MOS microcomputer with on-chip ROM and RAM is shown which is similar to U.S. Pat. No. 3,991,305. Two of the most widely used 8-bit microprocessors like that of U.S. Pat. No. 3,757,306 are described in Electronics, Apr. 18, 1974 at pp. 88-95 (the Motorola 6800) and pp. 95-100 (the Intel 8080). A microcomputer version of the 6800 is described in Electronics, Feb. 2, 1978 at pp. 95-103. Likewise, a single-chip microcomputer version of the 8080 is shown in Electronics, Nov. 25, 1976 at pp. 99-105 and a 16-bit microprocessor evolving from the 8080 is described in Electronics, Feb. 16, 1978, pp. 99-104. Another single-chip microcomputer, the Mostek 3872, is shown in Electronics, May 11, 1978, at pp. 105-110. A microprocessor which is particularly adapted for digital processing of real-time analog signals, the Intel 2920, is shown at Electronics, Mar. 1, 1979, pp. 105-110. An improved version of the 6800 is disclosed in Electronics, Sept. 17, 1979 at pp. 122-125, while a 16-bit microprocessor identified as the 68000 which evolved from the 6800 is described in Electronic Design, Sept. 1, 1978 at pp. 100-107. Floating point arithmetic is performed in a 16-bit processor called the 8087, used as a co-processor with the 8086, as described in Electronics, May 8, 1980, pp. 114-121.

It is therefore the principal object of the invention to provide an improved microprocessor device and system, and an improved method of constructing and operating such apparatus. Another object is to provide improved performance or capabilities of a microprocessor or microcomputer while at the same time reducing the size (and thus cost) of the semiconductor device needed to implement the desired features. A further object is to provide faster execution of signed multiply and divide instructions in a microprocessor. An additional object is to provide an improved ALU circuit for a single-chip microprocessor which can generate an absolute value function.

SUMMARY OF THE INVENTION

In accordance with one embodiment of the invention, an improved single-chip microprocessor device of the MOS/LSI type contains an ALU, several interal busses, a number of address/data registers, and an instruction register with associated control decode or microcontrol generator circuitry. The device communicates with external memory and peripherals by a bidirectional multiplexed address/data bus and a number of control lines. The ALU circuit is constructed to modify the carry-generate term so that the twos-complement function (and others) can be generated for either of the ALU inputs. By then connecting the most significant bit of the input to the arithmetic/logic control of the ALU, the absolute value function is generated. This results in faster signed multiply and divide instructions with less circuitry.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 2c (three sheets) is a map of the opcodes for the instructions executed by the microprocessor in the system of FIG. 1;

FIG. 2d is a timing diagram showing voltage vs. time for the system of FIG. 1;

FIG. 5a–5g are electrical schematic diagrams of various parts of the ALU and register strip within the microprocessor of FIGS. 3 and 4;

FIG. 7 is a timing diagram showing conditions in the system of FIGS. 1 and 3 for an add operation;

FIG. 7a is a diagram of a sixteen bit instruction word for the add operation of FIG. 7; and FIG. 8 is a timing diagram showing conditions in the system of FIGS. 1 and 3 for a signed divide operation.

DETAILED DESCRIPTION OF SPECIFIC EMBODIMENT

Microprocessor System

Figure 1:
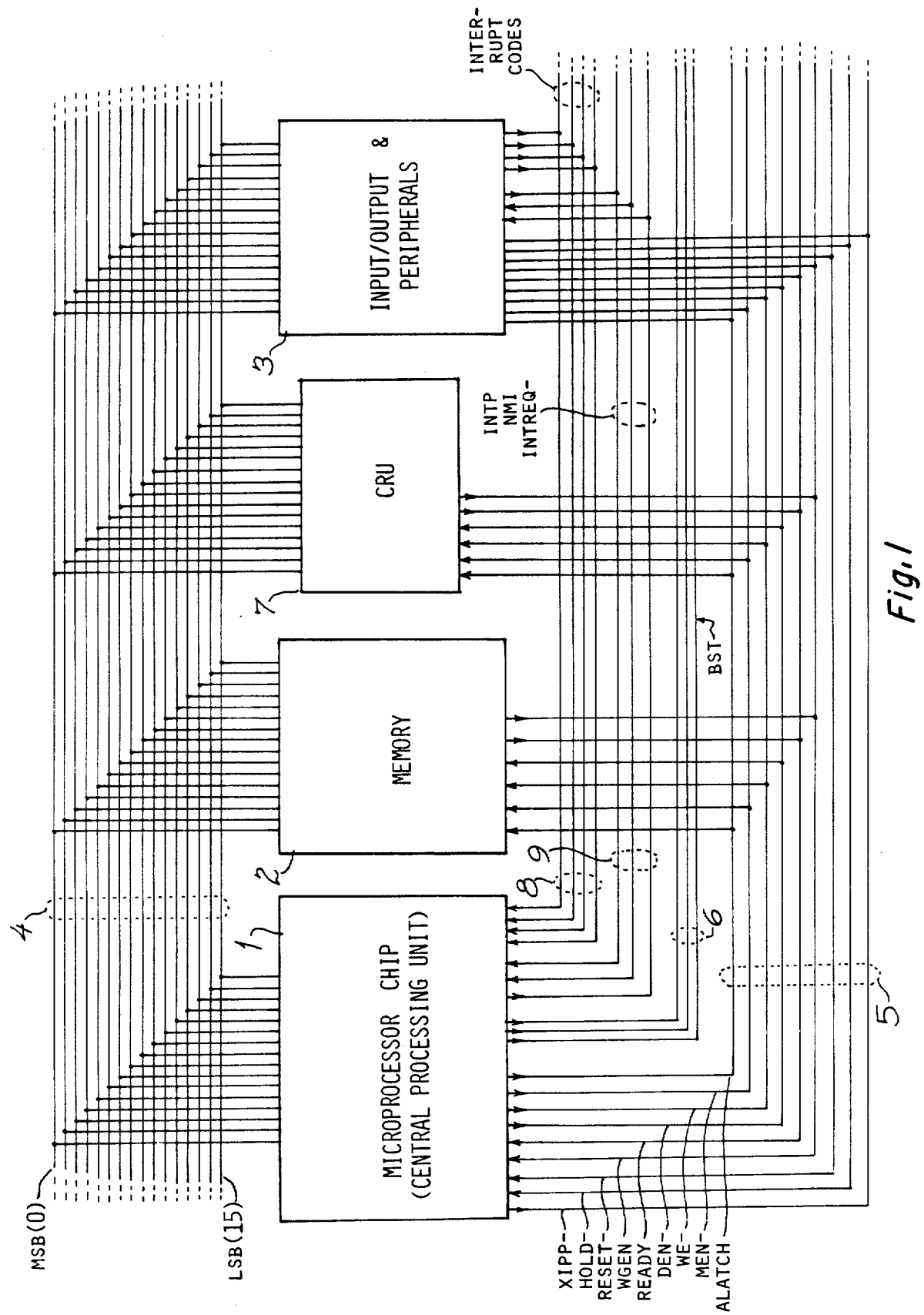
FIG. 1 is an electrical diagram in block form of a microprocessor system which may employ features of the invention.

The microprocessor device to be described herein may be of various configurations; in one embodiment the microprocessor device may be used in a system shown in generallized form in FIG. 1. The system may be, for example, a single-board general purpose microcomputer, a word processing system, a computer terminal with display and typewriter keyboard, a communications switching or processing system, or any of many applications of this type. The system includes a single-chip MOS/LSI central processing unit or microprocessor 1 which will be described in detail, along with a memory 2 and input/output or I/O device 3. The microprocessor, memory and I/O communicate with one another by a 16-bit, parallel, bidirectional, multiplexed address/data bus 4, along with control lines 5. Suitable supply voltage and clock terminals are included; for example the device may employ a single +5V Vcc supply and ground or Vss, and a crystal may be connected to terminals of the device 1 to control the frequency of an on-chip oscillator which will then define the system timing. It is understood that concepts of the invention may be used in a single-chip microcomputer with on-chip memory instead of the off-chip memory 2, as well as in microprocessor having separate address and data busses instead of the bidirectional bus 4.

In general terms, of course, the system of FIG. 1 functions in traditional manner. The microprocessor 1 fetches an instruction by sending out an address on the bus 4 to the memory 2 then receiving the instruction via the bus 4 from the addressed location in the memory 2. The microprocessor then executes this instruction, which usually requires several machine cycles (as defined by a clock or crystal) including sending out via bus 4 addresses for the operands stored in the memory 2, and receiving this data back on bus 4, as well as writing a result into memory 2 by an address followed by data on the bus 4. The I/O devices 3 may be addressed like memory 2; this interface to external devices is accomplished using the address/data bus 4 and control lines 5 since the I/O devices 3 occupy locations in the memory address space. This is known as memory-mapped I/O.

Figure 2A:
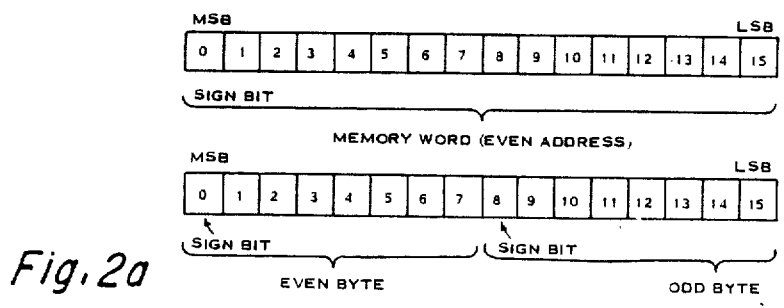
FIG. 2a is a diagram of the word, byte and bit definitions of the 16-bit data word used in the system of FIG. 1.

In the example to be described in detail, a 15-bit address is applied to the bus 4 from the microprocessor 1 (the 16th bit is a hardwired 0 for addressing), which will directly address $2^{15}$ or 32K words of memory. Each 16-bit word in memory includes two 8-bit bytes, so the microprocessor can address 64K bytes. The instruction set of the microprocessor 1 allows either word or byte operations. FIG. 2a shows the data word and byte formats and bit definitions for the system of FIG. 1 as described herein. Words are assigned even numbered addresses in memory 2. A 16-bit byte address is explicitly manipulated by all addressing modes, internally, but only the 15-bit word address is provided to the memory system 2 via bus 4, providing direct addressing of a 32K word memory space. The CPU device 1 supports several methods of increasing the amount of physical memory space which it can address, including paging, functional separation and mapping. Paging is accomplished by using a status bit on one of the control lines 5 as a 16th address bit. Functional separation is accomplished using "bus status codes" on BST lines 6 to enable separate memory spaces for instructions or data. Mapping is accomplished by using external map logic devices which are managed by mapping instructions; this may extend the physical address range to 16M bytes or $2^{24}$, meaning the equivalent of a 24-bit address.

Figure 2B:
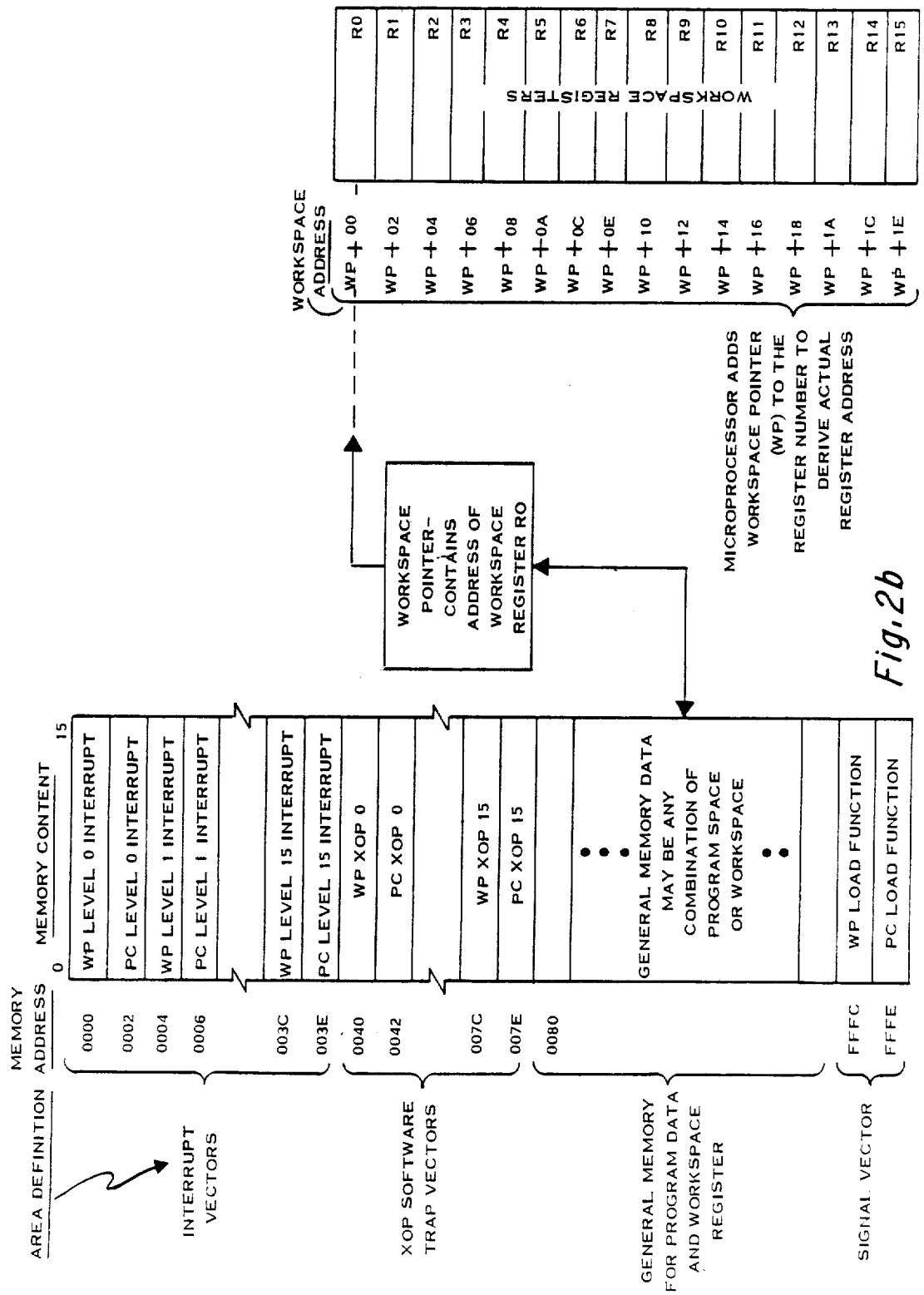
FIG. 2b is a memory map for the main memory 2 of FIG. 1 and a diagram of a number of adjacent memory locations in the general memory area referred to as a "workspace"

The system of FIG. 1 employs a memory-to-memory architecture in which the register files or working registers used by the CPU reside in the external memory 2 rather than in the microprocessor chip 1. This type of architecture allows faster response to interrupts and increased programming flexibility, compared to the traditional method of having most operands and return addresses stored in registers on the chip 1. The bulk of memory 2, particularly addresses 0080 to FFFA (all addresses are given in hexidecimal or base-16 in this description), is available for program storage or for "workspaces" as seen in FIG. 2b. The first word of a workspace is addressed by a workspace pointer (always an even address) and the remaining fifteen words are addressed by the workspace pointer plus 02 up to 1E (a 4-bit binary address). By maintaining the working registers in memory 2, a context switch or interrupt can be executed with a minimum of data transfer between microprocessor 1 and memory 2 because most of the data to be saved is already in the memory 2.

Interrupts are provided by four input lines 8 which define sixteen interrupt codes, sampled by the CPU 1 when an interrupt request line (one of three interrupt controls among the lines 9) is active and compared internally with an interrupt mask. If the code on the lines 8 is equal to or higher in priority than the mask, the interrupt sequence is initiated. If the comparison fails, the processor ignores the request. Another one of the control lines 9 produces a non-maskable interrupt, wherein priority codes on lines 8 are not material.

The system permits direct memory access (DMA) in which large blocks of memory words may be transferred via bus 4 between memory 2 and an I/O device 3 such as a disc memory. A "hold" command on one of the control lines 5 indicates to the processor 1 that an external controller desires to use the bus 4, so the processor enters a hold state with its terminals going to the bus 4 in a high impedence state.

The CPU chip 1 of FIG. 1 executes an instruction set including the instructions of Table A, although it is understood that other instructions could be defined for execution in addition to or in place of the particular ones described. Most of the instruction set of Table A is the same as that of a microprocessor sold by Texas Instruments under the part number TMS9900 and described in a book entitled "9900 Family Systems Design", published in 1978 by Texas Instruments Incorporated, P. O. Box 1443, M/S 6404, Houston, Texas 77001, Library of Congress Catalog No. 78-058005; such book is incorporated herein by reference. The instructions in table A are explained which were not in such book.

The source and destination addressing modes available in executing this instruction set are set forth below. Generally, the two-bit T fields Td and Ts (bits 4-5 and 10-11) define the addressing modes in instructions such as Add, Subtract, Move, Compare and the like.

The 16-bit opcodes for the instructions of Table A are shown in FIG. 2c which occupies three sheets. FIG. 2c is arranged in descending order to show the groups (based on the left-most or most-significant "1") which are used in the entry point generator circuitry as will be explained.

THE CPU CHIP

Figure 3:
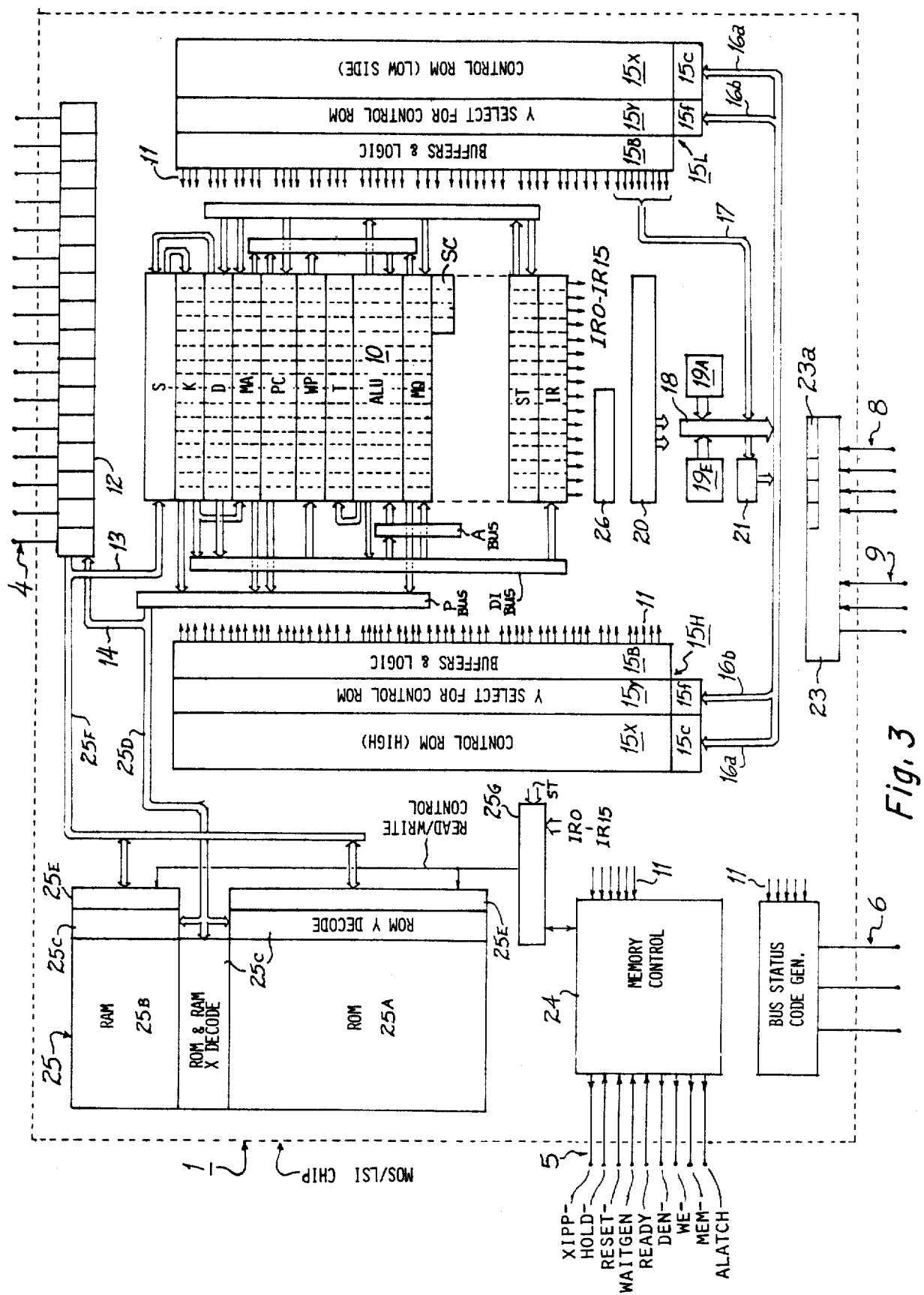
FIGS. 3 and 3a are an electrical diagram in block form of a MOS/LSI microprocessor chip including a CPU or central processor unit employed in the microprocessor system of FIG. 1 and utilizing features of the invention.
Figure 3A:
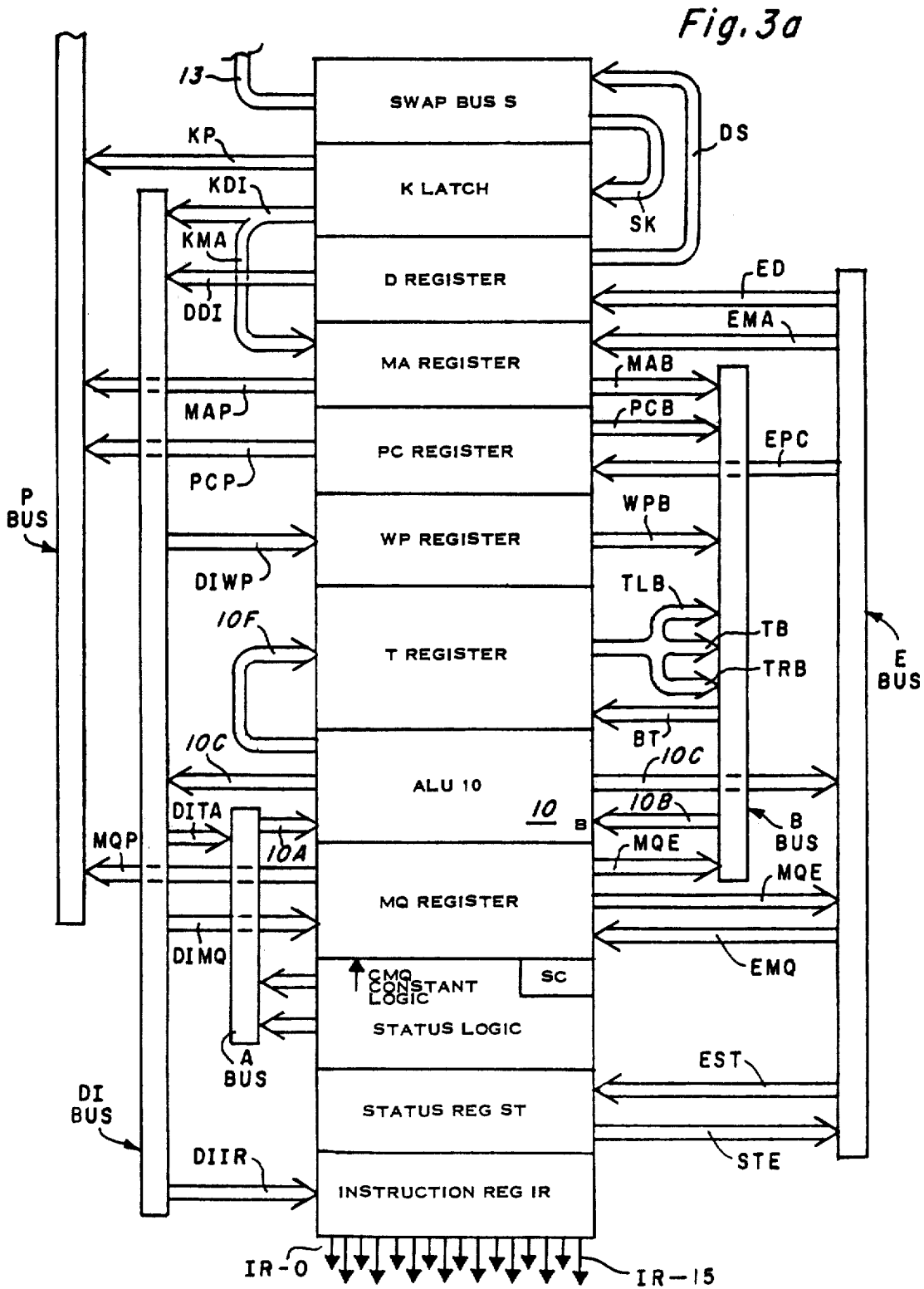
Figure 4:
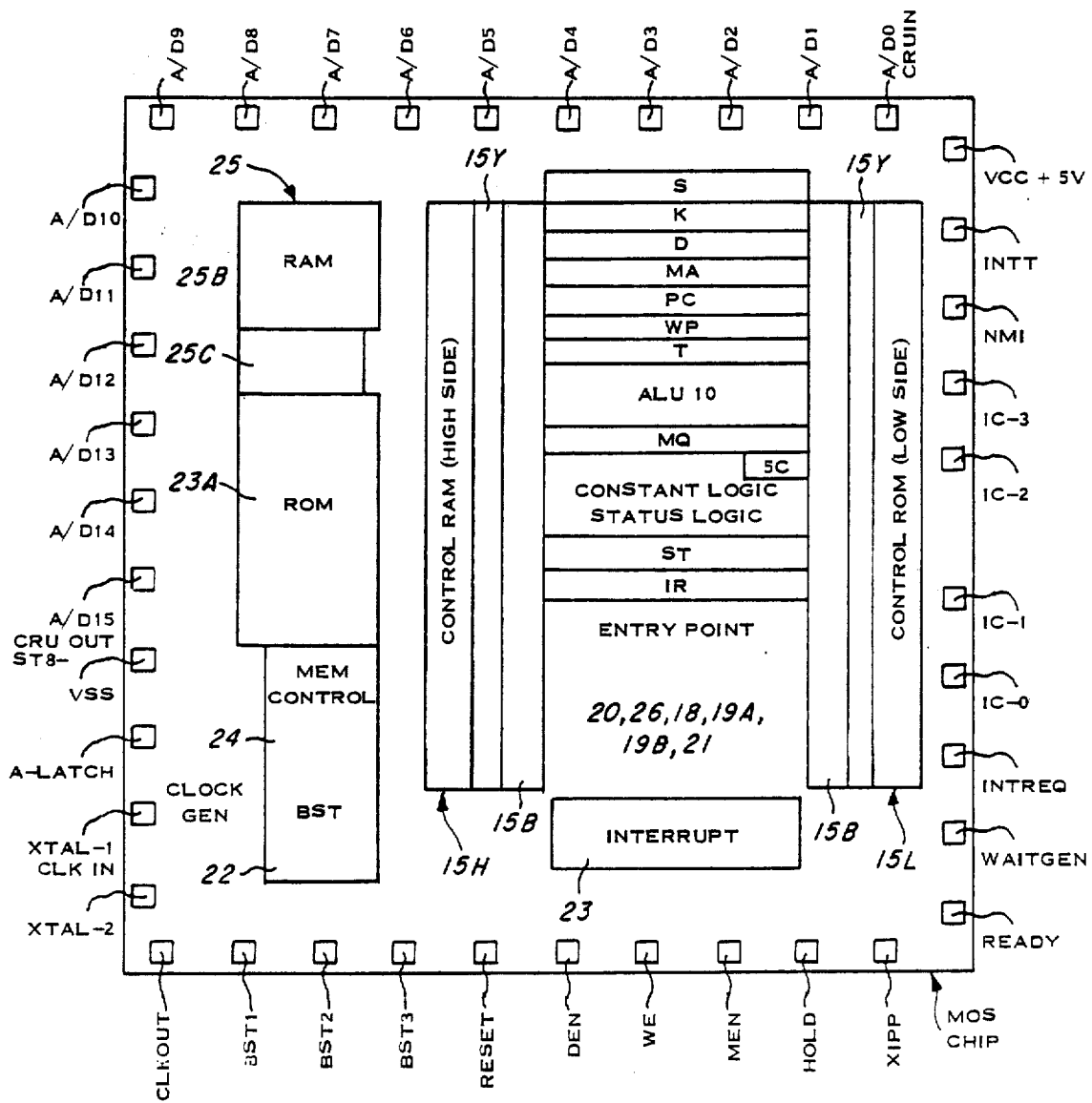
FIG. 4 is a greatly enlarged plan view of the semiconductor chip containing the microprocessor of FIG. 3 showing the physical layout of the various parts of the device.
Figure 5B:
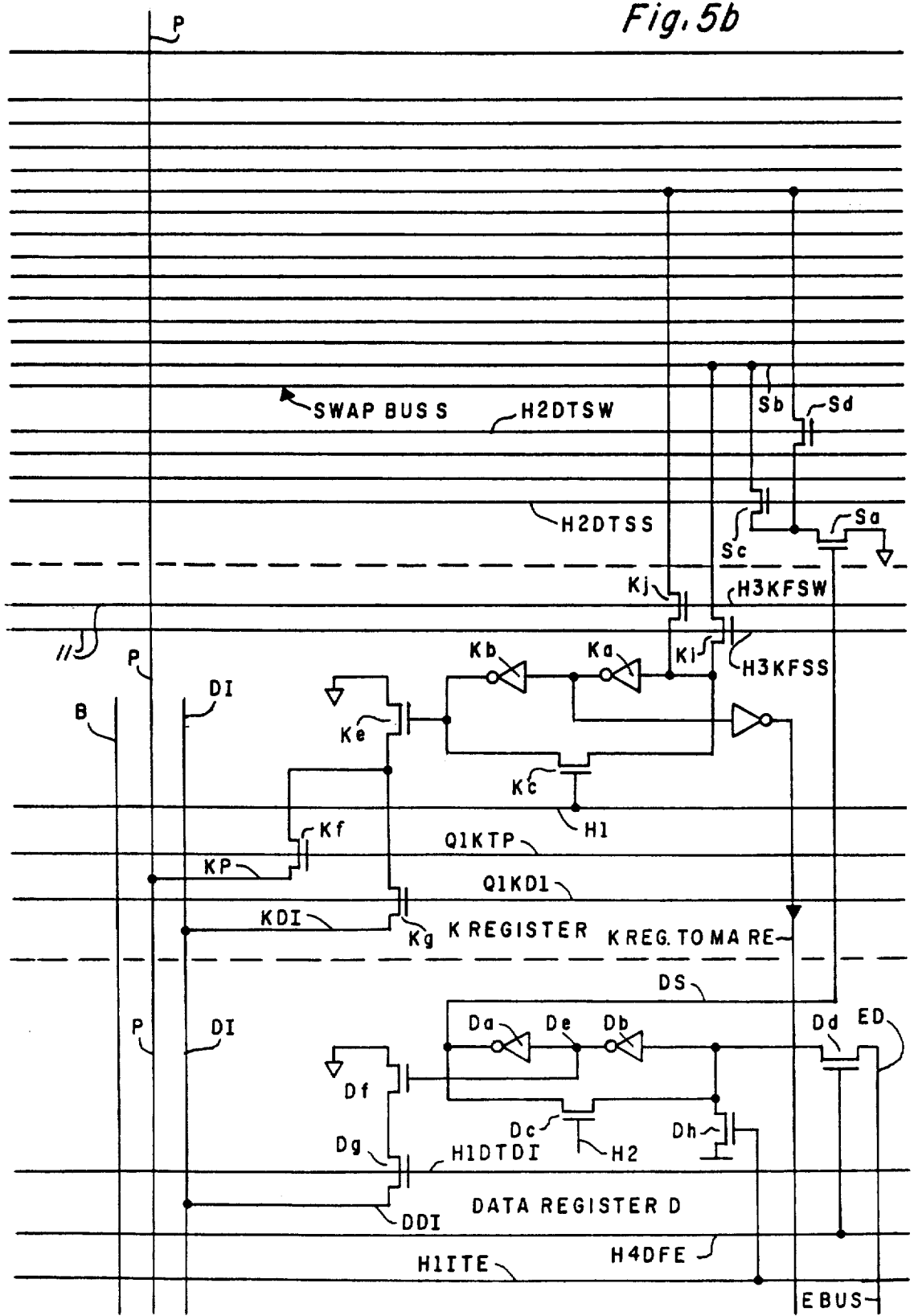
Figure 5C:
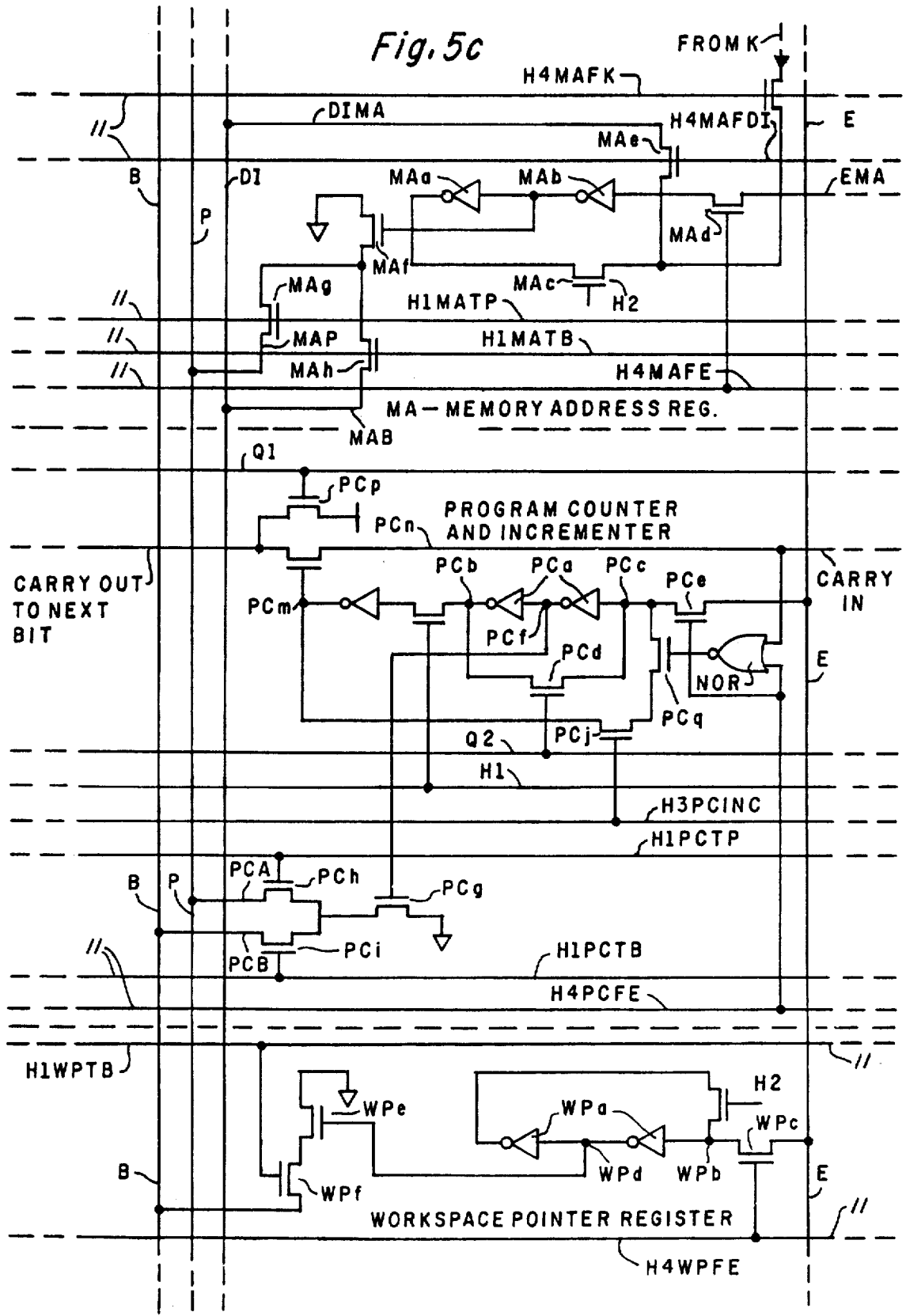
Figure 5F:
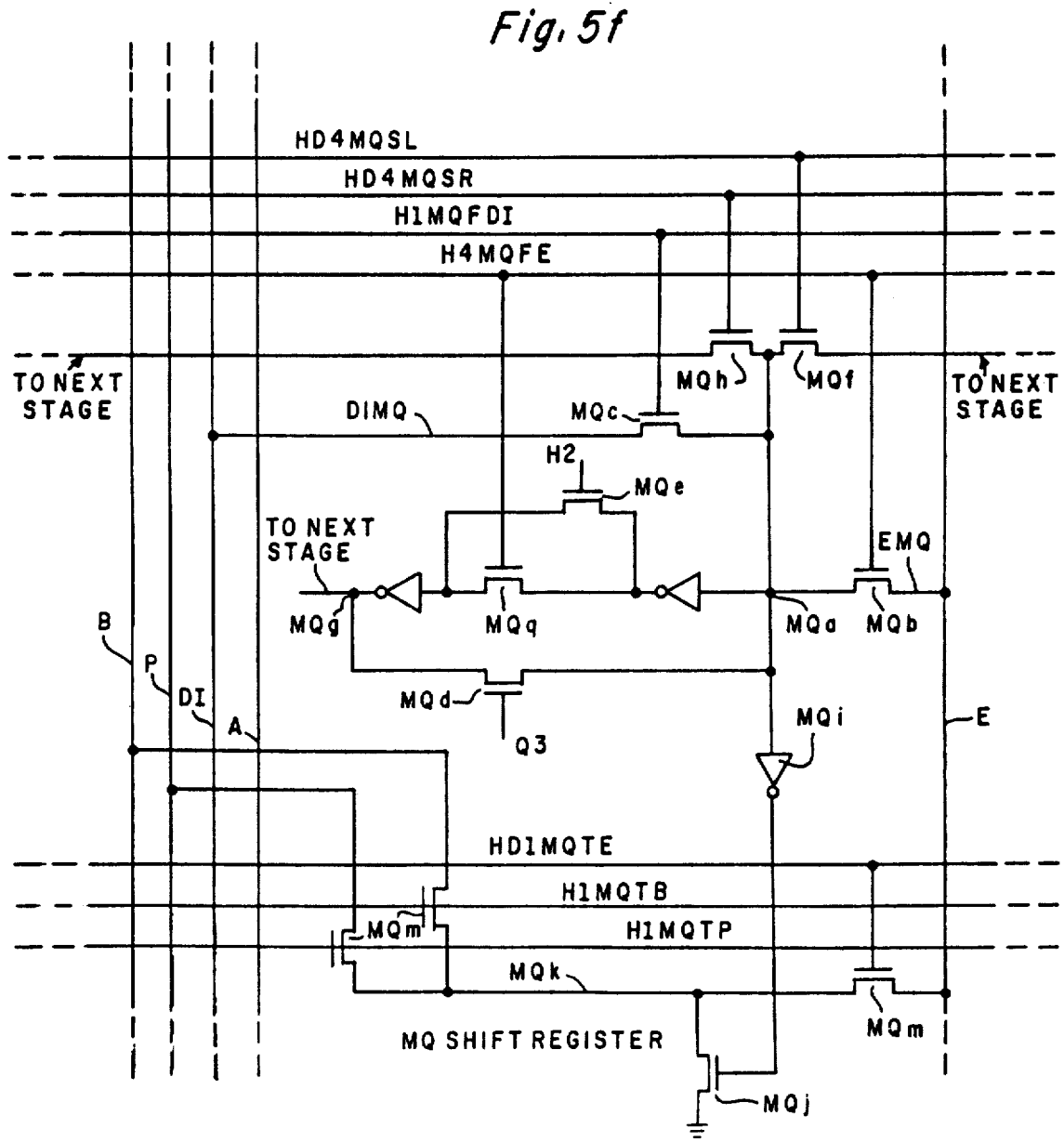
Figure 6:
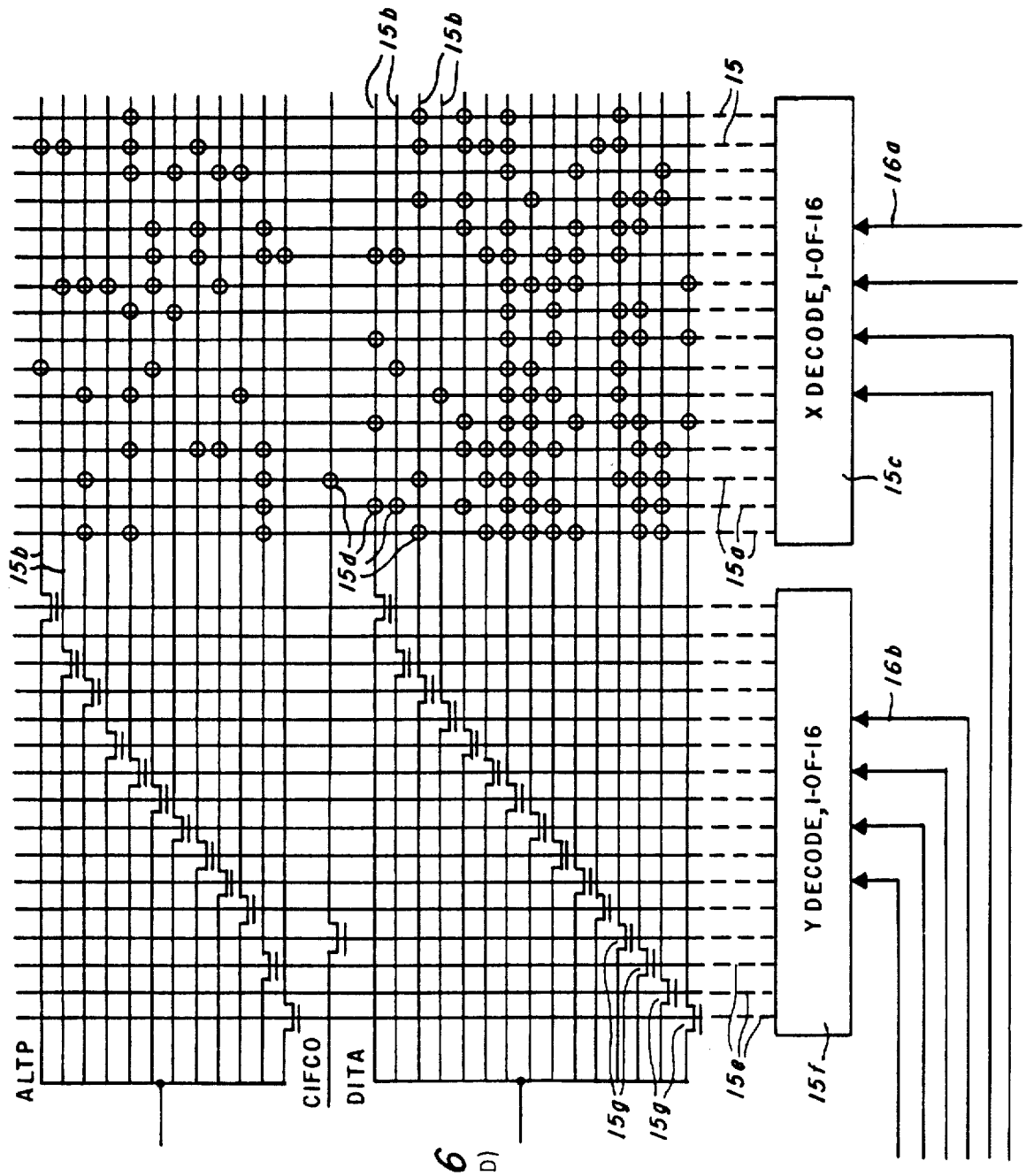
FIG. 6 is a detailed electrical schematic diagram of a compressed control ROM used in the microprocessor of FIGS. 3 and 4.

The processor architecture within the CPU chip 1 is shown in block diagram form in FIG. 3, in chip layout form in FIG. 4, and in logic diagram form in FIGS. 5 and 6. Generally, the processor includes an ALU or arithmetic logic unit 10 along with its associated registers, controls, data paths and related logic circuitry. This ALU is adapted for use in the system of FIG. 1, but features of this CPU architecture may be used in other similar systems.

The ALU 10 consists of sixteen parallel binary adder/logic states which function as the computational component of the processor. The ALU 10 receives a 16-bit "A" input 10A and a 16-bit "B" input 10B to produce a 16-bit parallel output 10C. The A input 10A of the ALU is from a 16-bit parallel A bus. The data on the A bus is active low; the indicators $\overline{A}$, A—, or NA should be used in referring to this bus to be technically accurate, and the same is true of the other busses. The A bus may receive data from any one of several sources as will be described, with selection of inputs being made by control inputs 11. Similarly, the B input 10B is from a 16-bit parallel B bus which may receive data from any one of several sources as defined by control inputs 11. The output 10C from the ALU 10 goes to either a P bus or an E bus under control on inputs 11. The ALU performs all the arithmetic and logic functions of table B required to execute microinstructions in the processor such as the functions of addition, subtraction, AND, OR, exclusive OR, complement, etc. as needed for the instructions of Table A.

The processor has a number of registers associated with the ALU 10, only three of which are accessable to the programmer. These three are a program counter or PC register, a workspace pointer or WP register, and a status register ST. Other internal registers which are used during the acquisition or execution of instructions are inaccessable to the programmer.

The program counter PC is a 15-bit counter that contains the word address of the next instruction following the instruction currently executing. The fifteen stages are left-justified with the 16th bit hardwired to 0; instructions in the memory 2 are constrained to word boundries, so a single byte is not accessed, only even addresses (words) can be used. The microprocessor references this address to fetch the next instruction from memory 2 and the program counter PC increments the address when the new instruction is executing. If the current instruction in the microprocessor alters the contents of the program counter PC, then a program branch occurs to the location in memory 2 specified by the altered contents of the program counter. All context switching operations, such as interrupts, plus simple branch and jump instructions, affect the contents of the program counter. The program counter can be loaded from the E bus by lines EPC, or its contents applied to the B bus via lines PCB or alternatively to the P bus via lines PCP. All such transfers to or from the program counter are defined by control inputs 11, of course. Internally, the program counter PC includes binary add circuitry to add-1 to the count contained in the 15-bit register at the proper time, again under control of an input 11.

The status register ST is a 16-bit register that contains the results of program comparisons, indicates program status conditions, and supplies interrupt mask level to the interrupt priority circuits. Each of the sixteen bit positions in the status register signifies a particular function or condition that exists in the microprocessor 1; these bit position assignments are shown in the above-referenced book. Some instructions use the status register ST to check for a prerequisite condition; others affect the values of the bits in the register; and others load the entire status register with a new set of parameters. Interrupts also modify the status register. The detailed description of the instruction set (Table A) shows the effect of each instruction on the status register. All sixteen bits of the status register ST may be loaded from the E bus via lines EST or loaded onto the E bus via lines STE, upon a command on the control lines 11.

The processor 1 uses blocks of words in the memory 2, called workspaces, for instruction operand manipulation instead of internal hardware registers. A workspace occupies sixteen contiguous memory words as in FIG. 2b, in any part of memory 2 that is not reserved for other use. The individual workspace registers may contain data or addresses, and function as operand registers, accumulators, address registers, or index registers. Some workspace registers are dedicated to take on special significance during execution of certain instructions.

A large number of these 16-word workspaces may exist in the 32K words of memory 2, providing a high degree of program flexibility. To locate the workspace in memory 2, the hardware register WP or the workspace pointer is used. The workspace pointer WP is a 15-bit register (left justified with 16th or LSB hardwired to 0) that contains the memory address of the first word in the workspace of FIG. 2b.

The processor accesses any register in the workspace of FIG. 2b by adding twice the register number to the contents of the workspace pointer and initiating a memory request for that word. The 16th bit is 0 so this is equivalent to adding two times the register number to WP. FIG. 2b illustrates the relationship between the workspace pointer and its corresponding workspace in memory. The WP register is loaded onto the B bus via lines WPB, or loaded from the DI bus via lines DIWP, under command of the control lines 11.

This workspace concept is particularly advantageous during operations that require a context switch, which is a change from one program to another, as in the case of a subroutine or an interrupt. Such an operation using a conventional multi-register arrangement requires that at least part of the contents of the register file be stored and reloaded, using a memory cycle to store or fetch each word. The processor 1 accomplishes this operation by changing the workspace pointer WP. A complete context switch requires only three store cyles and three fetch cycles, exchanging the program counter PC, status register ST, and workspace pointer WP. After the switch, the workspace pointer WP contains the starting address of a new 16-word workspace (FIG. 2b) in memory 2 for use in the new routine. A corresponding time savings occurs when the original context is restored. Instructions in the processor 1 that result in a context switch include: Branch and Load Workspace Pointer (BLWP), Return from Subroutine (RTWP), and an Extended Operation (XOP) instruction; device interrupts, the arithmetic overflow interrupt, illegal op-code detection trap, and others also cause a context switch by forcing the processor to trap to a service subroutine.

The internal registers not accessable to the user (programmer) in the processor 1 include a memory address or MA register, a data or D register, and a K register. The D register is connected as input to a swap bus S via parallel lines DS, and a swap bus output on lines SK may be applied to the K register, all under control of commands on the lines 11. The D register functions principally as a data output latch, and is loaded from the E bus via lines ED. The D register is applied to a DI bus by sixteen parallel lines DDI. The data path from the output 10C of the ALU to the E bus and thus to the D register via lines ED, then to the DI bus via lines DDI and to the A input of the ALU via the A bus is useful in divide routines, for example. Primarily, however, output data is loaded into the D register from the E bus, then to swap bus S via lines DS, and then to sixteen address/data buffers 12 via lines 13. Data can be transferred onto the swap bus S straight or swapped, depending upon factors like byte operations being performed; these transfers are of course under control of commands on lines 11.

The address/data buffers 12 are sixteen bidirectional, tristate buffers of conventional form, each having an input/output terminal connected to one of the external bus lines 4. These buffers usually receive addresses from the P bus via lines 14, or data via lines 13, for output to the bus 4; for input to the microprocessor chip 1, program or data words are applied via lines 13 to the swap bus S, thence to the K register via lines SK. It is also possible to load the P bus from the K register via lines PK, under a command on a line 11, and thus output the K register via the P bus.

The address to memory 2 are usually sent out from the microprocessor 1 via the P bus which is loaded by sixteen lines MAP from the MA register. The bits in this register can also be transferred to the B bus via parallel lines MAB, thus to the B input 10B of the ALU; alternatively the MA register may be loaded from the E bus via lines EMA or from the K latch via lines KMA, all as defined by control lines 11.

Another internal register transparent to a user is the temporary or T register. This register receives a 16-bit parallel output 10F from the ALU 10, and applies its output to the B bus in three ways: either directly via lines TB, shifted left via path TLB or shifted right via path TRB. The T register can also receive the B input 10B to the ALU delayed by $\frac{3}{4}$ of a clock cycle by a path BT. The T register provides an important function in multiply and divide operation as will be explained.

A register also used in multiply and divide operations is referred to as the MQ shift register (for multiply/quotient). This register has the capability of right shift or left shift by commands on lines 11. The register may be loaded from the A bus or the DI bus by 16-bit parallel lines AMQ and DIMQ, or may be outputted to the E bus or the B bus via lines MQE or MQB. For bit or serial CRU operations involving the CRU 7, the "0" bit of the MQ register is loaded from the "0" A/D buffer 12 at a line CMQ; the output for this purpose is by way of the D register, in parallel, even though only one bit may be used.

An instruction register IR provides the usual function of containing the current instruction, the instruction being executed during a given microcode state time (machine cycle). The instruction register IR is loaded from the DI bus via lines DIIR, or may be loaded into the E bus via lines IRE, under control of lines 11. Various fields of the instruction going to IR also can go to A bus by 2-bit and 4-bit connections IR2 and IR4. During each cycle, however, the contents of the instruction register IR are transferred via sixteen parallel lines IR-0–IR15 to entry point and microcontrol generator circuits as well as miscellaneous control circuitry.

The control signals 11 are generated in a control ROM 15 which is in this case split into two halves, 15H for the high side and 15L for the low side of the ALU and registers. Since there are many controls 11 used on only part of the bits, high or low, rather than all sixteen, space is saved by splitting the control ROM 15 in this manner. Each half of the control ROM has an X array 15X and Y-select array 15Y. Buffers 15B for each line 11 receive the select outputs from the Y array 15Y and introduce clock or other logic as may be needed to produce the controls in the lines 11. The number of microcontrol lines 11 is about 142, depending upon the instruction set (Table A) to be implemented, well within the addressing range (256) of an 8-bit address on lines 16 that go to both sides 15H and 15H. This 8-bit control ROM address is generated by entry point logic or by a microjump circuit. Microjump addresses, produced on eight lines 17 which receive outputs 11 from the control ROM, can generate a jump address for the next state. The microjump address on lines 17 is fed back to a logic array 18 that can also generate an entry point from inputs received from an execute entry point array 19E or a source/destination address entry point array 19A. A group detect circuit 20 receives the 16-bit instruction word from IR as well as status bits from ST and other controls and produces two inputs to the entry point arrays 19A and 19E, first a group identification and second a field. The group is determined by the left-most 1 of the opcode as seen in FIG. 2c, and the field is three or four bits starting with the left-most 1. The address to the control ROM 15 on the lines 16 may also be held in an 8-bit latch 21 so the same state is re-executed as in multiply or divide instructions; to this end 4-bit state counter SC is provided which counts state-times up to sixteen, and an overflow output of the state counter can control release of the holding latch 21. Thus, operation of the processor is controlled by instructions loaded into the IR register to generate an entry point via group detect 20 and logic arrays 18, 19A, 19E; the entry point is a starting address for the control ROM 15 entered on address lines 16. This address results in a specific set of commands on the control lines 11; some lines 11 will be active and most not. The address may also produce a jump address on lines 17 to define the control ROM address for the next state, or the next state may be another entry point, or may be the same state due to the holding latch 21. When the last state needed for the instruction is reached, the next instruction is loaded into register IR and another entry point derived.

The control outputs 11 from the control ROM 15 also produce bus status codes for lines 6 by a generator circuit 22. The bus status codes are each generated in response to the specified conditions; an external device can by decoding BST1-BST3 on the lines 6 and MEM— on one of the lines 5 determine exactly what activity is presently being implemented on the bus 4.

The interrupt codes on the lines 8 and the controls 9 are applied to interrupt control circuitry 23 within the chip 1. Bits 12-15 from the status register ST are also applied to the circuitry 23 to provide the interrupt mask for comparison with an interrupt code.

The external control lines 5 are connected to control generator circuitry 24 which responds to lines 11 from the control ROM as well as to other conditions within the chip, and to the lines 5, to produce the necessary internal controls and other external controls 5.

An on-chip memory array 25 is included on the processor chip 1 to provide added functions not in the instruction set of Table A. This memory 25 contains a section 25A of ROM, for example 512 words, and a section 25B of RAM, for example sixteen words or one workspace. The ROM 25A resides at hex addresses 0800-0BFE and the RAM 25B at hex addresses 0000-001E, but these are not within the memory map of FIG. 2b; these locations are merely examples. A memory address decode circuit 25C receives a memory address on lines 25D from the P bus and selects one word from the ROM or RAM 25A, 25B, which is input or output via data I/O circuit 25E to lines 13 on sixteen parallel lines 25F. An on-chip memory control 25G detects a specified opcode referred to as MID or macroinstruction detect (in this example either an illegal opcode or an XOP executed while bit-11 of status register ST is set to one; the control 25G is activated to transfer execution to the on-chip memory 25. When entering this operation, a context switch saves the WP, PC and ST register contents in registers R13, R14 and R15 of the 16-word workspace in RAM 25B. The CPU then executes assembly language instructions from the ROM 25A; during execution of these macroinstructions, various macroinstructions may access the external memory 2 in the usual manner using indirect, indirect autoincrement and indexed addressing modes. By providing this on-chip memory space 25 separate from the external user space (memory map of FIG. 2b), new instructions can be emulated in a manner completely transparent to the programmer.

Figure 4A:
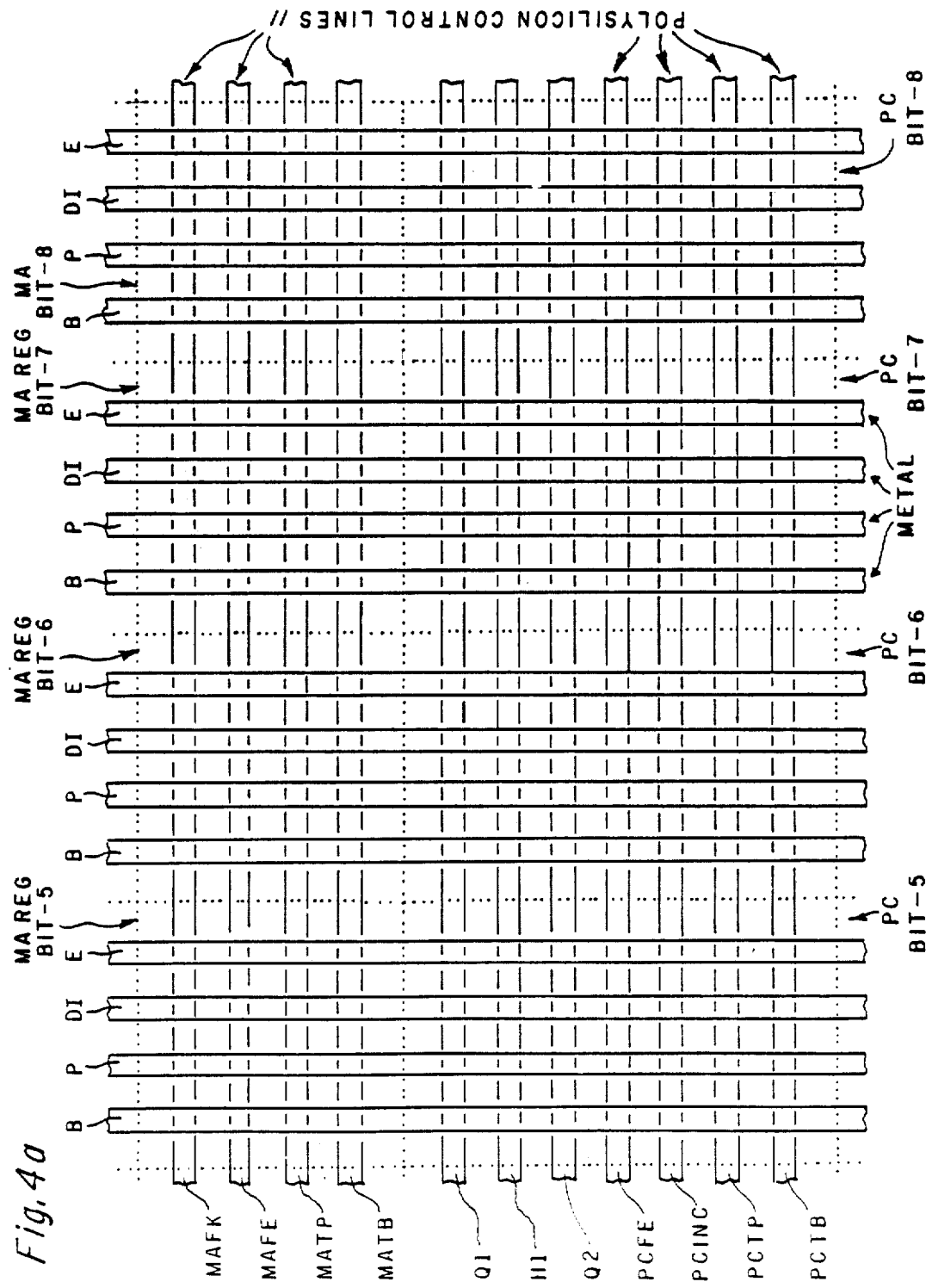
FIG. 4a is an enlarged detail view of a part of the layout of FIG. 4 showing the register strip.

An important feaure is that the ALU 10 and its associated registers K, D, MA, PC, WP, T, MQ, ST and IR as described above are laid out on an MOS/LSI chip in a regular strip pattern as seen in FIG. 4a. Each of these registers as well as the ALU contains sixteen bits or stages which are laid out in a pattern like memory cells, the bits arranged horizontally in FIG. 4 as seen; the A, B, DI, E and P busses of FIG. 3 are each sixteen parallel metal strips on top of the cells of the ALU and registers (rather than beside the registers as depicted in FIG. 3), and all of the dozens of control lines 11 are horizontal polysilicon lines as they are used as the control gates of for transistors in the ALU 10 and its registers. The number of control lines 11 needed for the ALU 10 is greater than for a single register such as the WP register, for example, and it is a fortunate circumstance that the space needed to lay out the ALU stages is greater than for a single register, so waste space is minimized. That is, the space needed in the control ROM 15 to generate the controls is the same as the space needed for the controlled circuitry. This layout arrangement is indeed advantageous when used with the compressed "wide-word" control ROM or decoder as will be described because it fits exactly alongside the control ROM with virtually none of the wasted space which would be used only for routing conductors in conventional construction of microprocessors. That is, all bus lines A, B, DI, E and P etc., and all control lines 11 are routed over or under functional regions or cells of the chip rather than over unused silicon, and almost all 90° turns are produced inherently at functional cells rather than in conductor routing. In the prior devices the control ROM, the registers, the ALU, etc., were islands of circuitry connected by busses or conductors. The enlarged view of FIG. 4a shows a small part of the ALU 10 and registers, illustrating the metal bus lines and the polysilicon control lines 11 for an N-channel silicon gate MOS device made generally according to U.S. Pat. No. 4,055,444 assigned to Texas Instruments.

It is significant to note that most of the connecting lines such as KDI, ED, EMA, MAB, DINP, etc. as mentioned above are not physically lines or elongated conductors at all but instead are merely metal-to-silicon contact areas along the metal bus lines of FIG. 4a. That is, routing of 16-bit parallel conductors is minimized by the strip feature.

THE ALU AND REGISTER CIRCUITS

The detailed circuits employed in the ALU and its associated registers will be described with reference to FIGS. 5a-5g. These circuits fit together as seen in FIG. 3. Generally, only one bit of the sixteen bits is shown in a strip. For the most part the remaining fifteen bits are the same as the one shown in detail, with some exceptions.

The ALU

Referring to FIG. 5e, one of the bits of the ALU 10 consists of a complex logic circuit having its A input 10A connected to the A bus and its B input 10B connected to the B bus while its output 10C is connected by transistors 10a and 10b to the E and P busses, respectively. The transistors 10a and 10b have connected to their gates control lines 11 labelled H1D1ALTE and H1ALTP, respectively. Throughout this description, the convention used for labelling commands or control lines 11 is (a) clock phase such as H1 or "half 1", then (b) the source such as "AL" (for ALU), and (c) "T" or "F" for to or from, followed by (d) the destination such as "P" or "E" bus. The half and quarter clocks are shown in the timing diagram of FIG. 2d. Using this convention, H1ALTP means this control 11 occurs during the H1 or half-1 clock and defines the connection from ALU to the P bus. An input to the A bus from the DI bus by line DIA and transistor 10c is controlled by an H1DITA command on a line 11, translating as 'DI to A, on H1 clock". Carry-in and carry-out for this bit are on lines Cout and Cin respectively, which are connected to adjacent stages of the ALU. The carry-out line is precharged to 1 or Vcc on Q1 by transistor 10d, then conditionally discharged after Q1 goes low by a transistor 10e. A NOR gate 10f drives the gate of the transistor 10e based upon a S1STOPG input on one of the control lines 11 (meaning stop generate, on S1), and the voltage on a node 10g. The output of gate 10f is the carry generate condition, and is made unconditionally 0 if STOPG is active. The node 10g, precharged to 1 on Q1, is connected to a node 10h by a transistor 10i which has the inverted A input on its gate. Similarly, in the carry propagate circuit a node 10j is precharged to 1 on Q1 and is connected by a transistor 10k (also receiving inverted A input) to a node 10m. The nodes 10h and 10n, precharged to 1 on Q1, are conditionally discharged by complex NAND/NOR logic circuit including transistors 10o driven by the $\overline{B}$ and $\overline{\overline{B}}$ input (inverted and twice-inverted), along with transistors 10p driven by the four control lines 11 labelled H2ALU1 to H2A-LU4. The four controls ALU1-ALU4 define the operation performed in the ALU as set forth in Table B. The "H3Logic" control on a line 11 is the arithmetic/logic control; when this line is high the ALU performs logic functions by unconditionally grounding the Cin line by transistor 10q, but when low Cin is applied to an input of an exclusive NOR circuit 10p, the other input being the inverted propagate signal from node 10j. The propagate signal also drives the gate of a transistor 10s in conventional manner. An important feature of the ALU 10 is the NOR gate 10f and its stop-generate control which allows the function of two's complement A to be produced with the same code as "pass A" but with H3Logic =0. This is produced by negative A and absolute value of A.

A carry input to the LSB of the ALU 10 is produced by microcode controls 11. A CIFCO or "carry-in from carry-out" control applies the carry-out from the MSB of the prior state to the carry-in at the LSB for the current state. A STCIN control applies the status bit-3 to the carry-in. A CIN control produces an unconditional carry in to the LSB.

The Workspace Pointer Register

A detailed circuit diagram of the workspace pointer register WP is shown in the lower part of FIG. 5c. This register includes two static invertor stages WPa with an input node WPb connected to the output during H2. The input node can be loaded from the DI bus by a transistor WPc having an H4WPFDI (WP from DI, on H4) command on its gate. An intermediate node WPd is connected to the B bus via an invertor WPe and a transistor WPf which has a command H1WPTB (WP to B on H1) on its gate. Fifteen bits are exactly the same, and bit sixteen is a hardwired 0 or Vss.

The workspace pointer register WP is used as the B input to the ALU 10 when generating the source and destination addresses for typical instructions of Table A. In a context switch, WP is saved by writing into memory 2, and the path for this operation is the B input of the ALU 10 and the P bus. WP is loaded from off-chip by the DI bus.

The Program Counter and Incrementer

Also seen in FIG. 5c, the program counter PC consists of a pair of static inverters PCa having an output node PCb connected to an input node PCc on Q2 by a transistor PCd. The input node PCc may be loaded from the vertical E bus by a transistor PCe having H4PCFE (PC from E, on H4) on its gate; this signal is on one of the control lines 11 running horizontally through the register matrix. The output of the program counter at an intermediate node PCf is connected to the gate of a transistor PCg, from which the program counter contents may be read out onto the vertical P or B busses by transistors PCh or PCi and lines PCP or PCB. The signals to control these transfers are H1PCTP (PC to P, on H1) and H1PCTB (PC to B, on H1) on separate horizontal control lines 11. The program counter is incremented when an H3PCINC signal appears on one of the control lines 11, turning on a transistor PCj; on H1 a transistor PCk turns on, loading the contents of this bit of the program counter onto the gate of a transistor PCm in series with a carry line PCn from the prior bit. Each bit of the carry path is precharged to 1 on Q1 by a transistor PCp. The carry-in for each bit on line PCn is connected by a NOR gate to the gate of a transistor PCq; the NOR gate also has the H4PCFE signal as one input. This circuit causes a carry to be propogated if the bit is 1 and carry-in is 1; or causes the bit to go from 0 to 1 if the carry-in is 1. The LSB stage is a hardwired 0 because only the 15-bit word address is sent out on the bus 4; the 16th bit is the byte address which is not used for access. For byte operation using the odd numbered byte, the next lower even number is the address then the byte swap circuitry S is activated. Thus, the 16th bit of the address is always 0. All the other fifteen bits are identical to that shown in FIG. 5c. The carry-out from the last bit is truncated as it would represent address FFFF (in hex).

The Memory Address Register

One bit of the MA register is seen in detail in the upper part of FIG. 5c. This register includes a pair of standard inverters MAa and MAb in each of the sixteen bits with feedback by a transistor MAc clocked on H2. The register is loaded from the E bus via sixteen separate lines EMA and a transistor MAd in each line. The gates of the sixteen transistors MAd are driven by a signal H4MAFE (MA from E, on H4) on one of the horizontal control lines 11. Likewise, each MA register bit is loaded from the K latch by a line KMA and a transistor MAe which has H4MAFK on its gate. Output from the MA register is taken at an intermediate node between the two inverters which is connected by a transistor MAf to two output transistors MAg and MAh. An H1MATP command on one of the control lines 11 turns on the transistor MAg and connects the output to the P bus via line MAP. An H1MATB command turns on the transistor MAh and connects the output to the B bus via the line MAB. Of course, it is understood that there are sixteen of each of the input and output lines to or from the busses, as is true for the other registers.

The MA register is usually loaded via P bus to the A/D buffers 12 as a basic part of most instruction sequences. It is usually loaded from the ALU output 10C via the E bus when an address is generated by adding WP+2S, for example, which is usually done for most instructions.

The Data Register

The D register or data register contains sixteen bits constructed as shown in detail in FIG. 5b. This register stage consists of a pair of inverters Da and Db with a feedback path via transistor Dc clocked on H2. The input of this register is from the E bus via transistor Dd and a line ED (one of sixteen lines ED), with the transistor Dd being controlled by an H4DFE (D from E) command on one of the lines 11. One of the outputs is from an intermediate node De and a transistor Df which connects to the DI bus by a transistor Dg and one of the sixteen lines DDI. This output is controlled by an H1DTDI (D to DI) command on a control line 11 which is connected to the gates of all sixteen of the transistors Dg. The other output from the D register is by sixteen lines DS, each going to the gate of a transistor Sa in the swap circuit S. The output of this transistor inverter is connected to the swap bus Sb by a transistor Sc having a "straight" command on its gate or a transistor Sd having a "swap" command on its gate. The line 11 connected to the gates of each of the sixteen transistors Sc carries the H2DTSS (D to swap-straight) command, while the line 11 carrying the H2DTSW (D to swap-swapped) is connected to the gates of the transistors Sd. E bus connects to Vcc via Dh and Dd.

The D register most often functions to receive the data output from the ALU10 via the E bus. Also, it functions as the source of an ALU operand input to the A side via the DI bus and the A bus. The D register is used mainly for data output, and also in ready and hold conditions and in divide operations, for example.

The K Latch

The K register or K latch contains sixteen identical stages, one of which is shown in FIG. 5b. The K register uses two standard inverters Ka and Kb with feedback on H1 by a transistor Kc. The output is connected to the gate of an inverter transistor Ke which is connected to output transistors Kf and Kg. A command Q1KTP (K to P) on one of the lines 11 turns on the transistor Kf and connects the output of the K register to the P bus via line KP. A command Q1KTDI (K to DI) turns on each of the sixteen transistors Kg and connects the output to the DI bus by sixteen lines KDI. The K register is loaded from the swap bus S in either straight or swapped condition by transistors Ki and Kj. A command H3KFSS on one of the control lines 11 connects the swap bus to the input of the K register via sixteen transistors Ki while a command H3KFSW connects the swap bus to the input of K via sixteen transistors Kj for swap or byte operations.

The Swap Circuit

The swap circuit S shown in FIG. 5a functions to connect the 16-bit D register to, or the K register from, the A/D buffers 12 via lines 13, either straight or with the high and low bytes swapped. Addresses are usually transferred in or out via the P bus that is connected to the A/D buffers without going through the swap bus, since addresses need not be swapped in byte operations, only data. Thus, data comes in via the K register and goes out via the D register, both using the swap bus S.

The Temporary Register

In FIG. 5d one stage of the sixteen stages of the T register or temporary register is seen in detail. This register consists of two standard inverter stages Ta and Tb with feedback on H2 via transistor Tc. Output from the T register is from a node Td at the output of the inverters, via an inverting transistor Te to a node Tf precharged to Vcc on Q3 via transistor Tg. A H1NLDI command on one of the lines 11 controls a transistor Th in series with transistor Te. Output from the node Tf directly to the B bus is by a line TB and a transistor Ti controlled by a H1TTB (T to B) command on a horizontal line 11. To shift left, the node Tf is connected by a transistor Tj to the B bus in the next more significant bit, to the left, via line TLB. To shift right, the node Tf is connected by a transistor Tk to the B bus in the next lower significant bit, to the right, via line TRB. The transistors Tj and Tk are controlled by commands H1TSLB and H1TSRB on two of the horizontal lines 11. The T register is loaded from the B bus by a line BT and a transistor Tm clocked on Q3 along with an inverter Tn and a transistor Tp which has H1TFB on its gate. This input is delayed by ¼ of a clock cycle. The transistor Tp at the inverter output has its output to the input node Tq to load the T register. The transistor TR at the inverter output and a transistor Ts with H1TFB on its gate goes to node Tf as a path for replacing the B bus information on the B bus after a delay. Thus, H1TFB followed by H1TTB is a quicker path than loading T register then reading it out onto the B bus in the next cycle. The "F" output from the ALU 10 is connected to the input Tq through a transistor Tt, and to the gate of a transistor Tu. The transistor Tu is in series with a transistor Tv, and both Tu and Tv are controlled by H1TFF. The output of the transistor Tv goes to the node Tf as an output from F to the B bus, which may be either straight, left-shifted, or right-shifted. This arrangement of the T register has great advantages in divide operations as described later.

The MQ Shift Register

The MQ register consists of sixteen bits, one of which is shown in FIG. 5f. This register may be shifted left or right by controls 11 and so is used in multiply and divide instructions, in CRU operations, and the like. Also, the register can be used as a general purpose working register. To this end, an input node MQa may be loaded from the E bus via transistor MQb and line EMQ by control H4MQFE, or loaded from the DI bus via transistor MQc and line DIMQ by control H1MQFDI. Feedback on Q3 is provided by a transistor MQd, and the output of the first stage is connected to the input of the second during H2 by a transistor MQe. The left shift function is provided by a transistor MQf connecting the input node MQa to a node MQg in the next lesser significant bit of the register, this occurring when a command HD4MQSL appears on one of the lines 11. The HD4 prefix for this control means that it occurs at H4 in the next state time, or delayed one clock cycle, from the time this microcode is generated in the control ROM 15. The right shift function is produced when an HD4MQSR control occur on a line 11 turning on a transistor MQh to connect the node MQa to the input node MQa of the next more significant bit of the register. For CRU I/O operations, the first and last bits of the sixteen bits in the MQ register are used as input and outputs via the DI bus or other busses coupling to the bus 4. The contents of the MQ register are applied to the E, P or B busses by a circuit consisting of an inverter MQi and inverter transistor MQj connecting input made MQa (twice inverted) to output node MQk. The output node MQk is connected by transistors MQm to the B, P and E busses when H1MQTB, H1MQTP or HD1MQTE commands occur. The output MQn of the first inverter MQp is connected to the input of the second stage by a transistor MQq on H4MQFE, when MQb is activated.

The Status Register

One bit of the sixteen bit status register ST is shown in FIG. 5g. This stage consists of a pair of inverters STa and STb, with feedback on Q4 by a transistor STc. An input node STd may be loaded from the E bus through a transistor STe when a command H1STFE occurs. Several other input transistors STf may set or load the input node from other sources, such as other controls 11 from the control ROM 15, etc. The output of the status register is taken at an intermediate node STg by an inverting transistor STh with a transfer transistor STi going to the E bus, under control of an HD1STTE command on a line 11.

Among the controls 11 from the CROM 15 are twelve control status signals CS1 to CS12 and two set status signals SS0 and SS2. These control various transistors STf to set or conditionally set the status bits according to the instruction set of Table D and the status bit definitions of Table B.

The Instruction Register

The instruction register IR is a sixteen bit register, one bit of which is shown in FIG. 5g, containing two inverter stages IRa and IRb with feed-back via transistor IRc on H2. The instruction register is loaded from the DI bus at input node IRd through transistor IRc on an H4IRLD command. Also, the instruction register may be cleared by a transistor IRf connecting the input node IRd to Vcc on an H1IRCLR command. True and complement outputs from the instruction register IR are taken at nodes IRg and IRh; these outputs go to the group detect 20 as the IR0–IR15 (and $\overline{\text{IR0–IR15}}$) signals, and are of course used to generate entry point addresses, etc. Coming in, bits which define the addresses of registers in the workspace are fed directly to the A inputs of the ALU for source and destination address generation, under control of commands 11 before reaching IR.

Certain ones of the IR outputs and ST outputs are used in a jump detect circuit 26 (FIG. 3) to detect any of the jump instructions and/or conditions as defined by the instruction set of Table D. The bits received by the jump detect circuit are: ST0–ST3, ST5, $\overline{\text{ST0–ST4}}$, IR4–IR7, and $\overline{\text{IR4–IR7}}$.

The group detect 20 receives all fifteen IR bits and complements and determines which of the eleven groups G0 to G10 the instruction word falls in, as defined in FIG. 2c. This is based on the position of the leading "1". Then, the four bit (or in some cases three bit or two bit) field defined also in FIG. 2c is used to generate the entry point address in a PLA.

THE COMPRESSED CONTROL ROM

The control signals on the lines 11 which define the operation of the processor are generated in a control ROM 15 as seen in FIG. 6. According to an important feature of this processor, the control ROM is compressed so that it uses much less space on the chip than prior control decoders. The control ROM 15 generates a set of microcontrol signals on the lines 11 for each individual address applied to the eight input address lines 16; the input is split into a four-bit X address on lines 16a and a four-bit Y address on the lines 16b. For each of the 256 possible address inputs, a unique combination of outputs could be produced, but in a typical embodiment less than 256 are required because an instruction set can be implemented with fewer than 256 states. In a processor which executes the instruction set of Table D, for example, 239 addresses or microcode states are used to selectively activate 142 controls 11 (including eight microjump addresses for lines 17). FIG. 6 shows only eight of the control lines 11, as examples, these being for the MAFDI, MATB, PCINC, PCTB, WPTB, ALTP, CIFCO and DITA signals. The others are similarly coded, depending upon the instruction set.

The control ROM 15 is split into an X-select portion 15x and a Y-select portion 15Y. The X-select portion contains sixteen X lines 15a and a variable number of Y lines 15b, depending upon the degree of compression, as will be explained. The X address on the lines 16a selects one-of-sixteen of the lines 15a using a standard decoder 15c.

Where a circle 15d appears at the intersection of an X line 15a and a Y line 15b, a transistor is formed which connects the Y line 15b to ground through a source-to-drain path. The X lines 15a are poly lines forming the transistor gates. Note that all of the Y lines 15b are populated, i.e., all have circles or transistors 15d. This is in contrast to control ROMs in prior microprocessors where a large part of the ROM is unpopulated (or if the opposite polarity logic is used, is almost totally populated). The control ROM 15 of FIG. 6 is compressed by eliminating all of the Y lines 15b which do not contain a transistor 15d.

The Y select portion 15Y of the control ROM of FIG. 6 includes sixteen lines 15e, only one of which is selected by a one-of-sixteen Y decoder 15f. The transistors 15g, in series with the lines 15b, cause the selection of one and only one of sixteen possible Y lines 15b in each group according which line 15e is high, determined by the binary code on the four lines 16b; all other Y lines 15b in each group are isolated from the control line 11 via transistors 15g.

REGISTER-TO-REGISTER ADD OPERATION

One of the most common instructions in any processor is "add". In the processor described herein, the add instruction uses workspace addressing. The two operands are obtained from registers in the main memory 2 via bus 4 and the result is stored in a register in the memory 2. Various addressing modes may be used, including direct, indirect, automatic incrementing, indexed, immediate or relative. The example uses register direct addressing for one operand located in the workspace, and register indirect addressing for the other operand which is in a register whose address is located in the workspace; the result is stored in the same register which is directly accessed for an operand. This instruction is referred to as "ADD *R, R" for programming purposes.

Execution of the add instruction of the example uses parts of seven "state" times or clock cycles. The timing sequence of clocks used in the microprocessor 1 is shown in FIG. 2d and includes four overlapping half-cycle clocks H1, H2, H3 and H4. The clock H4 of course occupies part of the state time after the one in question. Also, a state time contains four quarter cycle clocks Q1, Q2, Q3 and Q4. The device is built using N-channel technology, so the clocks are positive-going. Typically, the state time is 200 nsec., or the repetition rate is 5 MHZ. The clock input to the chip or the crystal frequency is four times the state frequency or about 20 MHZ.

The memory 2 can be accessed within a state time of the microprocessor 1, so when an address is sent out on the bus 4 during Q2 of a given state time the contents of the addressed location will appear on the bus 4 for input to the microprocessor chip 1 during Q4 or H4 in the same state time. The add instruction of the example requires five memory access operations: one to fetch the instruction, one to fetch the address of the "source" operand, two for the "source" and "destination" operands, and one to store the result in the memory 2 at the "destination" location.

The instruction for the add operation of this example is fetched before the previous instruction has completed execution. This pre-fetch feature results in a significant advantage in operating speed. It will be assumed that the prior instruction was also an add operation, and that the next instruction following the one of the example is also an add operation, to illustrate the pre-fetch feature and overlap of operations. Of the seven state times partially occupied by the add operation of this example, the first two are shared with the prior instruction and the last two are shared with the following instruction execution; thus only the central three are exclusively used by this add operation.

Referring now to FIG. 7 a timing chart for execution of the ADD *R, R instruction is illustrated. The seven state times to be discussed are designated S1 through S7. Briefly, during S1 (which overlaps the prior add instruction) the instruction word in question is pre-fetched by sending out the address which is in the PC register onto the bus 4 to access a location in the memory 2 (ordinarily the ROM part which contains program rather than the RAM part which is used for workspaces); then the contents of this location are received back on the bus 4 and loaded in to the instruction register IR. During S2, the result of the prior operation is written into the location in the memory 2 which is in the memory address register MA; the contents of MA register are sent out on the bus 4 followed by the result of the previous add operation. Meanwhile, during S2, the contents of the WP register are added in the ALU 10 to a number derived from the instruction word pre-fetched during S1; this number is two times the source register number, or 2S. So, the address of the source register is calculated during S2 and is stored in the MA register, then during S3 this address is sent out on the bus 4 to access the source address contained in the selected register of the workspace; this source address is read from the memory 2 and returns via bus 4 to be stored in MA and K registers in microprocessor 1. During S4 state time the address of the source operand is sent out from the K register onto bus 4 and the contents at this address in memory 2 returned via bus 4 to the K register.

Also during S4 the destination address is calculated in ALU 10 by adding the contents of the WP register to two times the "D" field of the instruction word and storing the result in the MA register. Next, during S5, this calculated D address (within the workspace, thus "direct") is sent out from MA register on bus 4 while the operand in the K register is moved to the T register. Then, the contents of the addressed register in memory 2 is returned via bus 4 to be stored in the K register of the chip 1, still during S5. Now the add operation is ready to be implemented; the S operand is in the T register and the D operand is in the K register, Thus, during state S6 the add operation is executed by adding the contents of K and T and putting the result in the D register, Meanwhile, however, during S6 the instruction for the next operation is pre-fetched by sending out the address in the program counter PC (which has been incremented) onto bus 4 and receiving the contents of this address in memory 2 back via bus 4 to be loaded during S7 in the instruction register IR in chip 1. Also, during S7 state time, the result of our example add operation is written into memory 2 by first sending out the address in the MA register (which is the D or destination address calculated during S4) onto bus 4, followed by the contents of the D register, completing execution of the ADD *R, R instruction. During S7, incidentially, the source address for the next instruction is calculated in the ALU 10 adding the contents of the workspace pointer WP to two times the S field of the instruction word accessed in S6, so another add operation is already two state times into its execution sequence. Accordingly, the states S6 and S7 correspond to the states S1 and S2 of FIG. 7.

The instruction word for "ADD R*, R" is shown in FIG. 7a. This is the sixteen bit word which is read during S1 state time in FIG. 7, i.e., the contents of the location addressed by the PC register, in this example. The first 3-bit field 010 says "add". The "B" field, bit 3, defines whether this is a byte operation or a word operation; in this example it is a word operation. If B=1, the operands are bytes and the operand addresses are byte addresses. With B=0, the operands are words. The TD and TS fields, bits 4, 5 and 10, 11, determine the addressing mode of that operand. In the example, TS is 00 so the S field (bits 12-15) contains the register number in the workspace which has the source operand. TD is 01, meaning indirect workspace register addressing mode, so the D field (bits 6-9) contains the register number in the workspace which has the address of the distination operand in it.

Considering the execution of the ADD *R, R instruction example in more detail, it will be noted that FIG. 7 also shows the contents of the various registers and busses as a function of time, as well as other features. Each of register and bus operations will be examined for each microcode state time, along with the control signals produced on the lines 11 to produce these operations.

In the S1 state time of FIG. 7, the control line 11 for H1PCTP (see FIG. 5c) is high during H1, turning on transistors PCi and placing the contents of the PC register on the P bus. Then the DEN command goes high on H1, so the P bus is loaded into the output buffers 12 and thus to the bus 4. The program counter PC is incremented during H3 time by the H3PCINC command on a line 11, turning on transistors PCj and PCm of FIG.

5c, so later at S6 the next instruction in sequence will be accessed. A DEN signal comes up on H2 on a control line 11 to produce a DEN-command at H3 on one of the lines 5 to enable the memory 2 to put data on the bus 4 beginning at Q4. The instruction word fetched here is valid on the bus 4 beginning at Q4, and is loaded into the K register via lines SK by a control H3 KFSS generated every H3 except when blanked; this control turns on the sixteen transistors Ki of FIG. 5b. During this state time S1 an add operation for the prior instruction occurs just as will be described for S6, directing the result to the E bus. A control SAMPI on one of the lines 11 causes the interrupt lines 8 to be sampled so that if an interrupt is present a context switch will occur.

Turning now to the S2 state time of FIG. 7, the instruction which is in the K register is connected to the DI bus at Q1 when the Q1KTDI command goes high and turns on the sixteen transistors Kg; this command occurs every Q1 unless blanked by a control line 11. A command 2STA at H1 causes the S field of the instruction word on the DI bus to be left-shifted and connected by four transistors Ca to bit-11 through bit-14 of the A bus as seen in FIG. 5e. The contents of the workspace pointer register WP are transferred to the B bus at H1 by the H1WPTB command on a line 11 turning on the transistors WPf of FIG. 5c. Thus, with WP on the B bus and 2S on the A bus, when the ALU 10 operates (at H2 and H3) an output will be produced at node 10C during H3 which is the sum (WP+2S). A command ALTE on a line 11 occurs at delayed H1 time, meaning delayed one state time, so at H1 of the next cycle the ALU output is connected by transistors 10a to the E bus. As will be described below with reference to the S7 state, the result of the previous operation is written into memory 2 from D register which was loaded from the E bus at H4; the ALU 10 loaded the E bus at S2, H1 (the same as HD1 for S1).

During the S3 state time of FIG. 7, the address of the register which will contain the source address is generated by an ALU operation. In this operation the contents of the workspace pointer register WP are applied to the B bus by an H1WPTB command turning on transistors WPf and an IR2D command at H1 which applies bit-6 through bit-9 of the instruction register IR to bit-11 through bit-14 of the DI bus via the transistors IRe' of FIG. 5g. The IR2D command in effect left shifts the D field of the instruction word (see FIG. 7a) by one bit to multiply by binary two, then applies it to the A input of the adder via the DI bus. The ALU 10 is in the add condition by default, none of the ALU 1–ALU 4 commands being present, and the input 10c is applied to the E bus at H1 of the next state time by the HD1ALTE command on the line 11 to the gates of transistors 10a (FIG. 5d).

EXECUTION OF SIGNED DIVIDE INSTRUCTION

The processor 1 executes the signed divide instruction (DIVS in Table A) in a preferred manner, compared to prior processor devices. Generally the processor implements the algorithm set forth at pp. 364–368 of "Digital Systems: Hardware Organization and Design", by Hill and Peterson, published 1973 by Wiley & Sons, Inc. The 16-bit divisor is fetched from the source address in memory 2 and its absolute value stored in the D register. The 32-bit dividend is fetched from workspace registers 0 and 1 in memory 2 and its absolute value placed in the T register (MSB's) and the MQ register (LSB's). The quotient is shifted one bit at a time into the LSB of the MQ register as the dividend is left-shifted. The sign of the result is the exclusive-OR of the signs of the divisor and dividend. The remainder is in the T register at the end of the algorithm, and is written into the workspace register 1, and has the same sign as the dividend. The signed quotient is written into workspace register 0 from the T register.

An important feature of the processor 1 particularly for the divide instruction is the construction of the B input to the ALU 10 with the shifted input from the T register and the ability to write the B input back into the B register in the next state time, depending upon the result of the ALU operation. Prior CPU's did the shift function at the ALU output instead of input, and used additional machine cycles to evaluate the result of each subtraction and restore the original number if it was negative. The CPU described herein can execute each subtract-test-restore sequence in one state time instead of several state times.

The divide algorithm requires sixteen repetitions of one basic sequence. The divisor is placed on the A input of the ALU 10 from the D register, the sixteen MSB bits of the dividend are placed on the B input from the T register, and the ALU does a substract operation. If the result is positive, the result goes into the T register and the original MSB bits from the B input discarded; if negative, however, the sixteen MSM bits are restored in the T register from the B input and the result discarded. Also, if the result is positive a one is shifted into the LSB of the MQ register in the next cycle, or if the result is negative, a 0 is written into the LSB of the MQ register when it is left shifted in the next cycle; thus the quotient is generated in the MQ register. The T register is left shifted as it is transferred to the B input in the next stop, and the MQ register is left shifted, putting its MSB onto the B bus to fill the LSB position vacated when the T register is left shifted. All of these operations occur in one state time in the basic sequence, and the sequence is repeated sixteen times in sixteen state times as the 4-bit state counter SC is incremented to overflow.

The signed divide instruction is executed in thirty-four state times, the first two and last two of which overlap the preceding and succeeding instructions because of the prefetch feature. A state-by-state description of the execution of this instruction is seen in FIG. 8.

In S1 of FIG. 8, the instruction is fetched by placing the program counter PC on the P bus and enabling DEN–; the program counter is incremented on H3. This state is usually part of a preceding instruction, as is the next state S2 in which the workspace pointer register WP is placed on the B bus, the A bus has a constant 2 placed on it by the constant generator circuit (a 1 is placed in bit-14 of the A bus providing "10" or binary2), and the ALU does an add operation with the result to the E bus on the next cycle. This gives the address of one of the operands, WP+2 or WR1. The state S2 also includes the write operation for the result of a prior instruction.

The S3 state is a read cycle for the operance at WP+2. The MA register is loaded from the E bus during H4 at the beginning of this state, then an MATP control at H3 sends out this address on the bus 4. In the ALU, the two's complement of the contents of the K register (which is assumed to have been previously fetched and left in the K register) is generated and placed on the E bus during H1 of the next state.

In the S4 state, the result of the previous ALU operation is transferred from the E bus to the D register, and the contents of the WP register transferred through the ALU by a WPTB control and a pass B operation, the result going to the E bus on the next cycle by a HD1ALTE command.

During the S5 state, the MA register is loaded from the E bus during H4, then the MA register transferred to the P bus during H1 and DEN− activated. This fetches the contents of workspace register RO since WP+0 was sent out as an address on the bus 4. RO, the MSB's of the dividend, is loaded from A/D buffer 12 into the K register, and an ALU operation of K+0 is preformed by KTDI (automatic) and D1TA commands. The result of the ALU operation goes into the T register at H1 of the next cycle.

In S6, the T register is loaded from the F output of the ALU by a TFF command, and the negative of the contents of the D register is generated by D1TA and DTDI commands and ALU 1, ALU 4 and STPG controls. The result goes to the E bus in the next cycle.

This is followed by a conditional subtract operation in S7 to check for a divisor of zero. The T register goes to the B input by a TTB command, and the negative of the K register goes to the A input. All four ALU controls ALU 1-ALU 4 are active. The result goes to the E bus on the next cycle.

ADDRESSING MODES

The instructions of Table A may be used with a variety of available modes for addressing random memory data (e.g., program parameters and flags), or formatted memory data (character strings, data lists, etc.). These addressing modes are:

(a) Workspace Register Addressing
(b) Workspace Register Indirect Addressing
(c) Workspace Register Indirect Auto Incrementing Addressing
(d) Symbolic (Direct) Addressing
(e) Indexed Addressing
(f) Immediate Addressing
(g) Program Counter Relative Addressing
(h) CRU Relative Addressing The following description explains the derivation of the effective address for each addressing mode. The applicability of addressing modes to particular instructions is included in Table D along with the description of the operations performed by the instruction. The symbols following the names of the addressing modes (R, *R, *R+, @LABEL or @TABLE (R)) are the general forms used to select the addressing modes for a register R.

Workspace Register Addressing, R

The workspace register R contains the operand, so the workspace pointer WP plus 2R gives the address of the operand. The workspace register addressing mode is specified by setting the two-bit T-field (TS or TD) of the instruction word equal to 00.

Workspace Register Indirect Addressing, *R

The workspace register R contains the address of the operand, so the workspace pointer WP plus 2R gives the address of the register R containing the address of the operand. The workspace register indirect addressing mode is specified by setting the two-bit T-field (TS or TD) in the instruction word equal to 01.

Workspace Register Indirect Auto Increment Addressing, *R+

The workspace register R contains the address of the operand just as in WR indirect addressing, but after acquiring the address of the operand, the contents of workspace register R are incremented. The workspace register indirect auto increment addressing mode is specified by setting the two-bit T-field (TS or TD) in the instruction word equal to 11.

Symbolic (Direct) Addressing, @LABEL

For this mode, the word following the instruction contains the address of the operand. The program counter PC contains the address of the instruction and (PC)+2 is the address of the operand. The symbolic address mode is specified by setting the two-bit T-field (TS or TD) in the instruction word equal to 10 and setting the corresponding S or D field equal to 0.

Indexed Addressing, @TABLE (R)

For indexed addressing, the word following the instruction contains the base address, the workspace register R contains the index value, and the sum of the base address and the index value results in the effective address of the operand. The indexed addressing mode is specified by setting the two-bit T-field (TS or TD) of the instruction word equal to 10 and setting the corresponding S or D field not equal to 0. The value in the S or D field is the register which contains the index value.

Immediate Addressing

Here the word following the instruction (i.e. PC plus 2 contains the operand. No T-field is pertinent here because only immediate instructions use this mode.

Program Counter Relative Addressing

For this mode, the eight-bit signed displacement in the right byte (bits 8-15) of the instruction is multiplied by two and added to the updated contents of the program counter PC; the result is placed in the PC.

CRU Relative Addressing

For CRU relative addressing, the eight-bit signed displacement in the right byte of the instruction is added to the CRU base address (bits 0-14 of the workspace register R12). The result is the CRU address of the selected CRU bit.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

TABLE A

THE INSTRUCTION SET

DATA TRANSFER INSTRUCTIONS

The MOV instructions are used to transfer data from one part of the memory 2 to another part, or from one location in the memory map to any other. The LOAD instructions are used to initialize registers to desired values. The STORE instructions provide for saving the status register (ST) or the workspace pointer (WP) in a specified workspace register.

Load Immediate—LI
Operation: The 16 bit data value located at the address given in the word immediately following the instruction LI is loaded into the workspace register R specified by the 4-bit field of bits 12-15.
Affect on Status Bits: LGT, AGT and EQ
Applications: The LI instruction is used to initialize a selected workspace register with a program constant such as a counter value or data mask.

Load Interrupt Mask Immediate—LIMI
Operation: The low order 4 bit value (bits 12-15) in the word immediately following the instruction is loaded into the interrupt mask portion of the status register (bits 12-15).
Affect on Status: Interrupt mask code only.
Application: The LIMI instruction is used to initialize the interrupt mask to control which system interrupts will be recognized.

LOAD Workspace Pointer Immediate—LWPI
Operation: The 16 bit value contained in the word immediately following the instruction is loaded into the workspace pointer WP.
Affect of Status: None
Application: LWPI is used to establish the workspace memory area for a section of the program.

MOVE Word—MOV
Operation: The word in the source location specified by bits 10-15 is transferred to the destination location specified by bits 4-9, without affecting the data stored in the source location. During the transfer, the word (source data) is compared to 0 with the result of the comparison stored in the status register.
Status Bits Affected: LGT, AGT and EQ
Application: MOV is used to transfer data from one part of the system to another part.

MOVE Byte—MOVB
Operation: Like MOV except operates on bytes. The Byte addressed by bits 10-15 is transferred to the type location specified by bits 4-9. If workspace register addressing is used, the most significant byte is selected. Otherise even addresses select the most significant byte; odd addresses select the least significant byte. During the transfer, the source byte is compared to zero and the results of the comparison are stored in the status register.
Status Bits Affected: LGT, AGT, EQ and OP
Application: MOVB is used to transfer 8 bit bytes from one byte location to another.

Swap Bytes—SWPB
Operation: The most significant byte and the least significant bytes of the word at the memory location specified by bits 10-15 are exchanged.
Affect on Status: None
Application: Used to interchange bytes if needed for subsequent byte operations.

Store Status—STST
Operation: The contents of the status register ST are stored in the workspace register specified by bits 12-15.
Affect on Status: None
Application: STST is used to save the contents of status register ST for later reference.

Store Workspace Pointer—STWP
Operation: The contents of the workspace pointer WP are stored in the workspace register specified by bits 12-15.
Affect on Status: None
Application: STWP is used to save the contents of the workspace pointer register WP for later reference.

ARITHMETIC INSTRUCTIONS

These instructions perform the following basic arithmetic operations: addition (byte or word), subtraction (byte or word), multiplication, division, negation, and absolute value. More complicated mathematical functions must be developed using these basic operations. The basic instruction set will be adequate for many system requirements.

Add—A
Operation: The data located at the source address specified by bits 10-15 is added to the data located at the destination address specified by bits 4-9. The resulting sum is placed in the destination location and is compared to zero.
Status Bits Affected: LGT, AGT, EQ, C and OV
Binary addition affects on status bits can be understood by studying the following examples:

| Source Operand | Destination Operand | Sum | LGT | AGT** | EQ | C | OV* |
|---|---|---|---|---|---|---|---|
| 1000 | 0001 | 1001 | 1 | 1 | 0 | 0 | 0 |
| F000 | 1000 | 0000 | 0 | 0 | 1 | 1 | 0 |
| F000 | 8000 | 7000 | 1 | 1 | 0 | 1 | 1 |
| 4000 | 4000 | 8000 | 1 | 0 | 0 | 0 | 1 |

*OV (overflow is set if the most significant bit of the sum is different from the most significant bit of destination operand and the most significant bit of both operands are equal.
**AGT (arithmetic greater than) is set if the most significant bit of the sum is zero and if EQ (equal) is 0.

Application: Binary addition is the basic arithmetic operation required to generate many mathematical functions. This instruction can be used to develop programs to do multiword addition, decimal addition, code conversion, and so on.

Add Bytes—AB
Operation: Like A but for bytes instead of words. The source byte addressed by bits 12-15 is added to the destination byte addressed by bits 4-9 and the sum byte is placed in the destination byte location. Recall that even addresses select the most significant byte and odd addresses select the least significant byte. The sum byte is compared to 0.
Status Bits Affected: LGT, AGT, EQ, C, OV and OP
Application: AB is one of the byte operations available on the processor. These can be useful when dealing with subsystems or data that use 8 bit units, such as ASCII codes.

Add Immediate—AI
Operation: The 16-bit value contained in the word immediately following the instruction is added to the contents of the workspace register specified by bits 12-15.

Status Bits Affected: LGT, AGT, EQ, C and OV

Application: This instruction is used to add a constant to a workspace register. Such an operation is useful for adding a constant displacement to an address contained in the workspace register.

Subtract Words—S

Operation: The 16-bit source data (location specified by bits 10-15) is subtracted from the destination data (location specified by bits 4-9) with the result placed in the destination location. The result is compared to 0.

Status Bits Affected: LGT, AGT, EQ, C and OV

Application: Provides 16 bit binary subtraction.

Subtract Bytes—SB

Operation: Like S except for bytes instead of words. The source byte addressed by bits 10-15 is subtracted from the destination byte addressed by bits 4-9 with the result placed in destination byte location. The result is compared to 0. Even addresses select the most significant byte and odd addresses select the least significant byte. If workspace register addressing is used, the most significant byte of the register is used.

Status Bits Affected: LGT, AGT, C, EQ, OV and OP

Application: SB provides byte subtraction when 8 bit operations are required by the system.

Increment—INC

Operation: The data located at the source address indicated by bits 10-15 is incremented and the result is placed in the source location and compared to 0.

Status Bits Affected: LGT, AGT, EQ, C and OV

Application: INC is used to increment byte addresses and to increment byte counters. Autoincrementing addressing on byte instructions automatically includes this operation.

Increment by Two—INCT

Operation: Two is added to the data at the location specified by the source address in bits 10-15 and the result is stored at the same source location and is compared to 0. Similar to INC.

Status Bits Affected: LGT, AGT, EQ, C and OV

Application: This can be used to increment word addresses, though autoincrementing on word instructions does this automatically.

Decrement—DEC

Operation: One is subtracted from the data at the location specified by bits 10-15, the result is stored at that location and is compared to 0. Similar to INC.

Status Bits Affected: LGT, AGT, EQ, C and OV

Application: This instruction is most often used to decrement byte counters or to work through byte addresses in descending order.

Decrement by Two—DECT

Operation: Two is subtracted from the date at the location specified by bits 10-15 and the result is stored at that location and is compared to 0. Similar to INC.

Status Bits Affected: LGT, AGT, EQ, C and OV

Application: This instruction is used to decrement word counters and to work through word addresses in descending order.

Negate—NEG

Operation: The data at the address specified bits 10-15 is replaced by its two's complement. The result is compared to 0. For example, if the specified data location contained $A342_{16}$, this instruction would cause the contents at this location to be changed to $5CBE_{16}$ and will cause the LGT and AGT status bits to be set to 1.

Status Bits Affected: LGT, AGT, EQ and OV (OV set only when operand = $8000_{16}$)

Application: NEG is used to form the 2's complement of 16 bit numbers.

Absolute Value—ABS

Operation: The data at the address specified by bits 10-15 is compared to 0. Then the absolute value of this data is placed in the same location.

Status Bits Affected: LGT, AGT, EQ and OV (OV set only when operand = $8000_{16}$).

Application: This instruction is used to test the data in the specified location and then replace the data by its absolute value. This could be used for unsigned arithmetic algorithms such as multiplication.

Multiply—MPY

Operation: The 16 bit data at the source address designated by bits 10-15 is multiplied by the 16-bit data contained in the destination workspace register R specified by bits 6-9. The unsigned binary product (32-bits) is placed in workspace registers R and R+1.

Affect on Status: None

Application: MPY can be used to perform 16-bit by 16-bit binary multiplication. Several such 32-bit subproducts can be combined in such a way to perform multiplication involving larger multipliers and multiplicands such as a 32-bit by 32-bit multiplication.

Divide—DIV

Operation: The 32 bit number contained in workspace registers R and R+1 (where R is a destination address specified at bits 6-9) is divided by the 16-bit divisor contained at the source address specified by bits 10-15. The workspace register R then contains the quotient and workspace R+1 contains the 16-bit remainder. The division will occur only if the divisor at the source address is greater than the data contained in R.

Affect on Status: Overflow (OV) is set if the divisor is less then the data contained in R. If OV is set, R and R+1 are not changed.

Application: DIV provides basic binary division of a 32-bit number by a 16-bit number.

Signed Multiply—MPYS

Operation: The signed two's complement integer in workspace register 0 is multiplied by the signed two's complement integer specified by the source address (bits 10-15). The result is a signed 32-bit product which is placed in workspace register 0 (for the 16 MSB's) and workspace register 1 (the 16 LSB's). The result is compared to zero.

Status bits affected: LGT, AGT and EQ.

Application: Provides signed multiplication for the system.

Signed Divide—DIVS
Operation: The signed 32-bit two's complement integer (dividend) in workspace registers 0 and 1 is divided by the signed 16-bit two's complement integer (divisor) specified by the source address (bits 10-15). The signed quotient is placed in workspace register 0 and the signed remainder is placed in workspace register 1. The sign of the quotient is determined by algebraic rules. The sign of the remainder is the same as the sign of the dividend and Remainder Divisor. The result is compared to zero. If the quotient cannot be expressed as a signed 16-bit quantity, status bit-4, OV or overflow is set.
Status bits affect: LGT, AGT, EQ and OV.
Application: Provides signed division for the system.

Add Double—AM
Operation: Two instruction words defined this operation. The 32-bit operand defined by the source address (bits 10-15 of the second word) and source address plus 2 is added to the 32-bit operand defined by the destination address (bits 4-9 of the second word) and destination address plus 2. The result is placed at the destination address and (DA+2).
Status bits affected: Same as Add.
Application: Same as Add but for 32-bit, double precision arithmetic.

Subtract Double—SM
Operation: Same as Add Double but the operation performed is subtraction.
Status bits: Same as subtract.
Application: Same as subtract but used for 32-bit double-precision arithmetic.

COMPARISON INSTRUCTIONS
These instructions are used fo test words or bytes by comparing them with a reference constant or with another word or byte. Such operations are used in certain types of division algorithms, number conversion, and in recognition of input command or limit conditions.

Compare Words—C
Operation: The 2's complement 16 bit data specified by the source address at bits 10-15 is compared to the 2's complement 16 bit data specified by the destination at bits 4-9. The contents of both locations remain unchanged. This instruction has the following example results:

| Source | Destination | Results of Comparison | | |
|---|---|---|---|---|
| Data | Data | LGT | AGT | EQ |
| FFFF | 0000 | 1 | 0 | 0 |
| 7FFF | 0000 | 1 | 1 | 0 |
| 8000 | 0000 | 1 | 0 | 0 |
| 8000 | 7FFF | 1 | 0 | 0 |
| 7FFF | 7FFF | 0 | 0 | 1 |
| 7FFF | 8000 | 0 | 1 | 0 |

Status Bits Affected: LGT, AGT and EQ
Application: The need to compare two words occurs in such system functions as division, number conversion, and pattern recognition.

Compare Bytes—CB
Operation: The 2's complement 8 bit byte at the source address (bits 10-15) is compared to the 2's complement 8 bit byte at the destination address (bits 4-9). OP (odd parity) is based on the number of bits in the source byte.
Typical results (assuming destination address is for an odd byte):

| Source | Destination | Results of Comparison | | | |
|---|---|---|---|---|---|
| Data | Data | LGT | AGT | EQ | OP |
| FFFF | FF00 | 1 | 0 | 0 | 0 |
| 7F00 | FF00 | 1 | 1 | 0 | 1 |
| 8000 | FF00 | 1 | 0 | 0 | 1 |
| 8000 | FF7F | 1 | 0 | 0 | 1 |
| 7F00 | 007F | 0 | 0 | 1 | 1 |

Status Bits Affected: LGT, AGT, EQ and OP
Application: In cases where 8 bit operations are required, CB provides a means of performing byte comparisons for special conversion and recognition problems.

Compare Immediate—CI
Operation: CI compares the contents of the specified workspace register R (bits 12-15) to the value contained in the word immediately following the instruction, and sets status bits accordingly.
Status Bits Affected: LGT, AGT and EQ
Application: CI is used to test data to see if system or program limits have been met or exceeded or to recognize command words.

Compare Ones Corresponding—COC
Operation: The data in the source location addressed by bits 10-15 act as a mask for the bits to be tested in workspace register R specified by bits 6-9. That is, only the bit position that contain ones in the souce data will be checked in R. Then, if R contains ones in all the bit positions selected by the source data, the equal (EQ) status bit will be set to 1. For example, if R contains $E306_{16}$ and source location contains $C102_{16}$,

| Source Mask = 1100 0001 0000 0010 |
|---|
| R = 1110 0011 0000 0110 | equal (EQ) would be set to 1 since everywhere the test mask data contains a 1 (underlined positions), R also contains 1.
Status Bits Affected: EQ
Application: COC is used to selectively test groups of bits to check the status of certain sub-systems or to examine certain aspects of data words.

Compare Zeroes Corresponding—CZC
Operation: The data located in the source address specified by bits 10-15 act as a mask for the bits to be tested in the workspace register R specified by bits 6-9. That is, only the bit positions that contain ones in the source data are the bit positions to be checked in R. Then if R contains zeroes in all the selected bit positions, the equal (EQ) status bit will be set to 1. For example, if the source location contains the value C102$_{16}$ and the R location contains 2301$_{16}$,

```
Source Data = 1100 0001 0000 0010
         R = 0010 0011 0000 001
                       X
``` the equal status bit would be reset to zero since not all the bits of R (note the X position) are zero in the positions that the source data contains ones.
Status Bits Affected: EQ
Application: Similar to the COC instrution.

LOGIC INSTRUCTIONS

The logic instructions allow the processor to perform boolean logic for the system. Since AND, OR, INVERT, and Exclusive OR (XOR) are available, any boolean function can be performed on system data.

AND Immediate—ANDI
Operation: The bits of the workspace register specified by bits 12-15 are logically ANDed with the corresponding bits of the 16-bit binary constant value contained in the word immediately following the instruction. The 16-bit result is compared to zero and is placed in the register R. Recall that the AND operation results in 1 only if both inputs are 1.
Status Bits Affected: LGT, AGT and EQ
Application: ANDI is used to zero all bits that are not of interest and leave the selected bits (those with ones in Value) unchanged. This can be used to test single bits or isolate portions of the word, such as a four-bit group.

OR Immediate—ORI
Operation: The bits of the specified workspace register R are ORed with the corresponding bits of the 16-bit binary constant contained in the word immediately following instruction. The 16-bit result is placed in R and is compared to zero. Recall that the OR operation results in a 1 if either of the inputs is a 1.
Status Bits Affected: LGT, AGT and EQ
Application: Used to implement the OR logic in the system.

Exclusive OR—XOR
Operation: The exclusive OR is performed between corresponding bits of the source data addressed by bits 10-15 and the contents of workspace register specified by bits 6-9. The result is placed in workspace register R and is compared to 0. Note that the exclusive OR operation will result in a 1 if only one of the inputs is a 1.
Status Bits Affected: LGT, AGT and EQ
Application: XOR is used to implement the exclusive OR logic for the system.

Invert—INV
Operation: The bits of the data addressed by the source address bits 10-15 G are replaced by their complement. The result is compared to 0 and is stored at the source location. For example, if R contains 00FF$_{16}$, the instruction would change the contents to FF00$_{16}$, causing the LGT status bit to set to 1.
Status Bits Affected: LGT, AGT and EQ
Application: INV is used to form the 1's complement of 16 bit binary numbers, or to invert system data.

Clear—CLR
Operation: Zeroes are placed in the memory location specified by bits 10-15.
Affect on Status: None
Application: CLR is used to set problem arguments to 0 and to initialize memory locations to zero during system startup operations.

Set To One—SETO
Operation: All ones (or hex FFFF) are placed in the memory location specified by bits 10-15.
Affect on Status: None
Application: Similar to CLR.

Set Ones Corresponding—SOC
Operation: This instruction performs the OR operation between corresponding bits of the source data address by bits 10-15 and the destination data addressed by bits 4-9. The result is compared to 0 and is placed in the destination location.
Status Bits Affected: LGT, AFT and EQ
Application: Provides the OR function between any two words in memory.

Set Ones Corresponding Byte—SOCB
Operation: Like SOC except used for bytes instead of words. The logical OR is performed between corresponding bits of the byte addressed by source address bits 10-15 and the byte addressed by the destination address of bits 4-9 with the result compared to 0 and placed in destination location.
Status Bits Affected: LGT, AGT, EQ and OP
Application: The SOCB provides the logical OR function on system bytes.

Set to Zeroes Corresponding—SZC
Operation: The source data addressed by bits 10-15 forms mask for this operation. The bits in the destination data (addressed by bits 4-9) that correspond to the one bits of the source data (addressed by 10-15) are cleared. The result is compared to zero and is stored in the destination location.
Status Bits Affected: LGT, AGT and EQ
Application: SZC allows the programmer to selectively clear bits of data words. For example, when an interrupt has been serviced, the interrupt request bit can be cleared by using the SZC instruction.

Set to Zeroes Corresponding, Bytes—SZCB
Operation: Like SZC except for bytes instead of words. The byte addressed by the source address bits 10-15 will provide a mask for clearing certain bits of the byte addressed by the destination address bits 4-9. The bits in the destination byte that will be cleared are the bits that are one in the source byte. The result is compared to zero and is placed in the destination byte.
Status Bits Affected: LGT, AGT, EQ and OP
Application: Provides selective clearing of bits of system bytes.

SHIFT INSTRUCTIONS

These instructions are used to perform simple binary multiplication and division on words in memory and to rearrange the location of bits in the word in order to examine a given bit with the carry (C) status bit.

Shift Right Arithmetic—SRA
- Operation: The contents of the workspace register R specified by bits 12-15 are shifted right by a number of times specified by bits 8-11, referred to as Cnt, filling the vacated bit position with the sign (most significant bit) bit: The shifted number is compared to zero.
- Status Bits Affected: LGT, AGT, EQ and C
- Number of Shifts: Cnt (number from 0 to 15 contained in the instruction) specifies the number of bits shifted unless Cnt is zero in which case the shift count is taken from the four least significant bits of workspace register 0. If both Cnt and these four bits are 0, a 16-bit position shift is performed.
- Application: SRA provides binary division by a power of two defined by Cnt.

Shift Left Arithmetic—SLA
- Operation: The contents of workspace register R specified by bits 12-15 are shifted left Cnt times (or if Cnt=0, the number of times specified by the least four bits of RO) filling the vacated positions with zeroes. Cnt is specified by bits 8-11. The carry contains the value of the last bit shifted out to the left and the shifted number is compared to zero.
- Status Bits Affected: LGT, AGT, EQ, C and OV
- Application: SLA performs binary multiplication by a power of 2 defined by Cnt.

Shift Right Logical—SRL
- Operation: The contents of the workspace register R specified by bits 12-15 are shifted right Cnt times, where Cnt is specified by bits 8-11, (or if Cnt=0, the number of times specified by the least four bits or RO) filling in the vacated positions with zeroes. The carry contains the value of the last bit shifted out to the right and the shifted number if compared to zero.
- Status Bits Affected: LGT, AGT, EQ and C
- Application: Performs binary division by a power of 2 defined by Cnt.

Shift Right Circular—SRC
- Operation: Workspace register R defined by bits 12-15 is right shifted Cnt time defined by bits 8-11. On each shift the bit shifted and the shifted number is compared to 0. The number of shifts to be performed is the number Cnt, or if Cnt=0, the number contained in the least significant four bits of RO.
- Status Bits Affected: LGT, AGT, EQ and C
- Application: SRC can be used to examine a certain bit in the data word, change the location of 4-bit groups, or swap bytes.

Shift Left Arithmetic Double—SLAM
- Operation: Same as shift left arithmetic but the 32-bit operand defined by the source address (bits 10-15 of second word) plus SA+2 is shifted. Vacated bit positions are filled with zeroes. If the count Cnt=0, the count is in bit 4-7 of workspace register 0.
- Application: Same as SLA except used for double precision arithmetic. Multiplies by a selected power of 2.

Shift Right Arithmetic Double—SRAM
- Operation: Same as SRA except the 32-bit operand defined by SA plus SA+2 is shifted. Vacated bit positions filled with MSB.
- Application: Same as SRA, but provides double precision arithmetic. Divides by a selected power of 2.

UNCONDITIONAL BRANCH INSTRUCTIONS

These instructions give the programmer the capability of choosing to perform the next instruction in sequence or to go to some other part of the memory to get the next instruction to be executed. The branch can be a subroutine type of branch, in which case the programmer can return to the point from which the branch occurred.

Branch—B
- Operation: The source address, bits 10-15, is placed in the program counter, causing the next instruction to be obtained from the location specified by this source address.
- Affect on Status: None
- Application: This instruction is used to jump to another part of the program when the current task has been completed.

Branch and Link—BL
- Operation: The source address at bits 10-15 is placed in the program counter and the address of the instruction following the BL instruction is saved in workspace register 11.
- Affect on Status: None
- Application: This is a shared workspace subroutine jump. Both the main program and the subroutine use the same workspace registers. To get back to the main program at the branch point, a BL instruction can be used at the end of the subroutine which causes the R11 contents (old PC value) to be loaded into the program counter.

Unconditional Jump—JMP
- Operation: The signed displacement defined by bits 8-15 is added to the current contents of the program counter PC to generate the new value of the program counter. The location jumped to must be within −128 to +127 words of the present location.
- Affect on Status: None
- Application: If the subprogram to be jumped to is within 128 words of the JMP instruction location, the unconditional JMP is preferred over the unconditional branch since only one memory word (and one memory reference) is required for the JMP while two memory words and two memory cycles are required for the B instruction. Thus, the JMP instruction can be implemented faster and with less memory cost than can the B instruction.

Execute—X
- Operation: The instruction located at the source address specified by bits 10-15 is executed.
- Status Bits Affected: Depends on the instruction executed.

Application: X is useful when the instruction to be executed is dependent on a variable factor.

TABLE B

| CONTROL LINES TO ALU | | | | ALU FUNCTIONS | |
|---|---|---|---|---|---|
| | | | | ALU FUNCTION | |
| ALU 1 | ALU 2 | ALU 3 | ALU 4 | H3 Logic = 1 | H3 Logic = 0 |
| 0 | 0 | 0 | 0 | 1 | |
| 0 | 0 | 0 | 1 | A + B | |
| 0 | 0 | 1 | 0 | $A + \overline{B}$ | |
| 0 | 0 | 1 | 1 | A | |
| 0 | 1 | 0 | 0 | $\overline{A} + B$ | |
| 0 | 1 | 0 | 1 | B | |
| 0 | 1 | 1 | 0 | $\overline{A \oplus B}$ | ADD |
| 0 | 1 | 1 | 1 | A · B | |
| 1 | 0 | 0 | 0 | $\overline{A} + \overline{B}$ | |
| 1 | 0 | 0 | 1 | $A \oplus B$ | A sub B |
| 1 | 0 | 1 | 0 | $\overline{B}$ | |
| 1 | 0 | 1 | 1 | $A \cdot \overline{B}$ | |
| 1 | 1 | 0 | 0 | $\overline{A}$ | |
| 1 | 1 | 0 | 1 | $\overline{A} \cdot B$ | |
| 1 | 1 | 1 | 0 | $\overline{A + B}$ | |
| 1 | 1 | 1 | 1 | 0 | |

What is claimed is:

1. An arithmetic logic unit for a microprocessor, such unit including a plurality of parallel stages, each stage comprising:
   a first single-bit ALU input,
   a second single-bit ALU input,
   a single-bit carry-in input from a prior one of said stages,
   a single-bit carry-out output to a next one of said stages,
   a plurality of control lines for defining an operation performed in said arithmetic logic unit,
   first logic means connected to receive said first and second inputs and responsive to said control lines for producing a carry propagate term output,
   second logic means connected to receive said first and second inputs and responsive to said control lines for producing a carry generate term output,
   third logic means providing an Exclusive NOR function and having first and second NOR inputs and an ALU output, the first NOR input being conditionally coupled to said carry generate term output through fourth logic means and also responsive to one of said control lines, the second NOR input being coupled to said carry propagate term output,
   and said fourth logic means coupled to said first NOR input and to said carry generate term output being responsive to one other of said control lines.

2. A unit according to claim 1 wherein said first and second logic means both receive true and a complement inputs from said first and second ALU inputs.

3. A unit according to claim 2 wherein said first NOR input of said third logic means receives said carry-in input.

4. A unit according to claim 1 wherein said arithmetic logic unit contains a plurality of like bits parallel stages, each having said first and second ALU inputs connected to receive respective parallel bits from parallel bus means, to process data bits in parallel.

5. A unit according to claim 3 wherein said fourth logic means includes:
   a first transistor connecting said first NOR input to a reference level to hold such first NOR input unconditionally in one logic state when a one of said control inputs is in one state, or to couple said first NOR input to said carry-in input and carry generate term output when said one of the control inputs is in another state.

6. A unit according to claim 5 wherein said fourth logic means also includes:
   a second transistor having source-to-drain path in series between said carry-in input and said carry-out output with a gate coupled to said carry propagate term output, and transistor means conditionally coupling said carry-out output to a reference level in response to said carry-generate term output.

* * * * *